United States Patent
Abdoli et al.

(10) Patent No.: US 11,936,508 B2
(45) Date of Patent: *Mar. 19, 2024

(54) OFDM COMMUNICATIONS SYSTEM WITH METHOD FOR DETERMINATION OF SUBCARRIER OFFSET FOR OFDM SYMBOL GENERATION

(71) Applicant: Huawei Technologies Co., Ltd., Shenzhen (CN)

(72) Inventors: Javad Abdoli, Kanata (CA); Zhenfei Tang, Ottawa (CA)

(73) Assignee: Huawei Technologies Co., Ltd., Shenzhen (CN)

(*) Notice: Subject to any disclaimer, the term of this patent is extended or adjusted under 35 U.S.C. 154(b) by 53 days.

This patent is subject to a terminal disclaimer.

(21) Appl. No.: 17/377,002

(22) Filed: Jul. 15, 2021

(65) Prior Publication Data

US 2021/0367818 A1 Nov. 25, 2021

Related U.S. Application Data

(63) Continuation of application No. 16/553,838, filed on Aug. 28, 2019, now Pat. No. 11,070,411, which is a
(Continued)

(51) Int. Cl.
*H04L 12/28* (2006.01)
*H04L 5/00* (2006.01)
(Continued)

(52) U.S. Cl.
CPC ........ *H04L 27/2605* (2013.01); *H04L 5/0007* (2013.01); *H04L 27/2657* (2013.01);
(Continued)

(58) Field of Classification Search
CPC ........... H04L 5/0007; H04L 27/26025; H04W 72/0453; H04W 74/0833
(Continued)

(56) References Cited

U.S. PATENT DOCUMENTS 9,820,281 B1 11/2017 Werner et al.
2017/0332378 A1 11/2017 Werner et al.
(Continued)

FOREIGN PATENT DOCUMENTS

CN 107018107 A 8/2017
CN 107615698 A 1/2018
(Continued)

OTHER PUBLICATIONS

Samsung, "On numerology for NR-RACH", 3GPP TSG RAN WG1 Ad hoc#2, R1-1711598, Jun. 27-30, 2017, 4 Pages, Qingdao, China.
(Continued)

*Primary Examiner* — John Pezzlo
(74) *Attorney, Agent, or Firm* — Slater Matsil, LLP

(57) ABSTRACT

The middle subcarrier of the baseband OFDM signal of each numerology may need to be shifted appropriately with respect to other numerologies to comply with a nested grid. These shifts can be signalled to the UE with an associated overhead. Methods and systems are provided to reduce overhead for OFDM communication. Reduced overhead can translate into increased bandwidth for the system, and/or reduced power/battery consumption in the UE. A transmitter generates an OFDM signal associated with a first subcarrier spacing of a first numerology (μ), a middle subcarrier frequency of a set of usable resource blocks (RBs) of the first numerology being offset from a carrier frequency by a first offset having a value ($k_{0,x}^\mu$) in units of subcarriers, the value of the first offset being defined by a specific formula. The transmitter transmits the OFDM signal according to the first subcarrier spacing and the first offset.

30 Claims, 9 Drawing Sheets

Related U.S. Application Data continuation of application No. 16/199,883, filed on Nov. 26, 2018, now Pat. No. 10,419,257.

(60) Provisional application No. 62/631,144, filed on Feb. 15, 2018.

(51) Int. Cl.
| | | |
|---|---|---|
| *H04L 27/26* | (2006.01) | |
| *H04W 52/02* | (2009.01) | |
| *H04W 72/0453* | (2023.01) | |
| *H04J 1/16* | (2006.01) | |

(52) U.S. Cl.
CPC ... *H04W 52/0261* (2013.01); *H04W 72/0453* (2013.01); *H04W 74/0833* (2013.01)

(58) Field of Classification Search
USPC .......................................... 370/252, 329, 430
See application file for complete search history.

(56) References Cited

U.S. PATENT DOCUMENTS

| | | | |
|---|---|---|---|
| 2018/0035416 A1 | 2/2018 | Yi et al. | |
| 2018/0262900 A1 | 9/2018 | Moon et al. | |
| 2019/0082408 A1 | 3/2019 | Kim et al. | |
| 2019/0090210 A1 | 3/2019 | Islam et al. | |
| 2019/0190751 A1 | 6/2019 | Nguyen et al. | |
| 2019/0208482 A1* | 7/2019 | Tooher ................. | H04L 5/0092 |
| 2019/0289513 A1 | 9/2019 | Jeon et al. | |
| 2020/0083938 A1 | 3/2020 | Park et al. | |
| 2020/0092055 A1 | 3/2020 | Choi et al. | |
| 2020/0178220 A1 | 6/2020 | Kang et al. | |
| 2020/0213960 A1* | 7/2020 | Jung ...................... | H04L 27/26 |
| 2020/0280415 A1 | 9/2020 | Chen et al. | |
| 2021/0004038 A1* | 1/2021 | Lin ............................ | G05F 3/30 |
| 2022/0312394 A1* | 9/2022 | Xue ...................... | H04L 5/0044 |
| 2023/0103739 A1* | 4/2023 | Kim .................... | H04L 27/0014 |
| | | | 370/329 |
| 2023/0113223 A1* | 4/2023 | Yi ........................ | H04J 11/0073 |
| | | | 370/329 |

FOREIGN PATENT DOCUMENTS

| | | |
|---|---|---|
| RU | 2414051 C1 | 3/2011 |
| WO | 2006105005 A2 | 10/2006 |
| WO | 2009061053 A1 | 5/2009 |
| WO | 2017188664 A1 | 11/2017 |
| WO | 2017195048 A1 | 11/2017 |
| WO | 2017196249 A1 | 11/2017 |
| WO | 2018010103 A1 | 1/2018 |

OTHER PUBLICATIONS

3GPP TS 38.211 V15.0.0,3rd Generation Partnership Project; Technical Specification Group Radio Access Network; NR;Physical channels and modulation(Release 15), Dec. 2017. total 73 pages.
3GPP TS 38.214 V15.0.0,3rd Generation Partnership Project; Technical Specification Group Radio Access Network NR;Physical layer procedures for data (Release 15),Dec. 2017. total 71 pages.
3GPP TS 38.331 V15.0.0, 3rd Generation Partnership Project; Technical Specification Group Radio Access Network NR Radio Resource Control (RRC) protocol specification (Release 15), Dec. 2017. total 188 pages.
DraftCR to 38-211 capturing the Jan18 ad-hoc meeting agreements, 3GPP TSG-RAN1 Meeting AH18-01, R1-1801291, Vancouver, Canada, Jan. 22-26, 2018, 81 Pages.
Ericsson:"draftCR to 38.211 capturing the Jan. 18 ad-hoc meeting agreements", 3GPP TSG-RAN1 Meeting AH18-01 R1-1801283, Jan. 22-26, 2018, 79 Pages, Vancouver, Canada.
Huawei:"Draft Reply LS on PRB grid in the NR", 3GPP TSG RAN WG1 Meeting #91,R1-1721578, Reno, USA, Nov. 27 Dec. 1, 2017. total 2 pages.
Panasonic, "Discussion on frequency domain frame structure for NR", 3GPP TSG RAN WG1 Meeting #86bis, R1-1609815, Oct. 10-14, 2016, 6 Pages, Lisbon, Portugal.
RAN1 Chairman's Notes, 3GPP TSG RAN WG1 Meeting 91, Reno, USA, Nov. 27-Dec. 1, 2017.
Spreadtrum Communications, "Remaining issues on OFDM Signal generation", 3GPP TSG RAN WG1 Meeting AH 1801, R1-1800284, Jan. 22-26, 2018, 10 Pages, Cancouver, Canada.
Spreadtrum Communications, "Remaining issues on OFDM signal generation", 3GPP TSG RAN WG1 Meeting Ah 1801, R1-1800284, Jan. 22-26, 2018, 10 Pages, Vancouver, Canada.
RAN WG1 Zhenfei Tang "Reply LS on PRB grid in the NR", 3GPP TSG RAN WG1 Meeting #91,R1-1721669, Reno, USA, Nov. 27 Dec. 1, 2017. total 2 pages.
Panasonic, "Discussion on frequency domain frame structure for NR," 3GPP TSG RAN WG1 Meeting #86bis Lisbon, Portugal, Oct. 10-14, 2016, R1-1609815, 6 pages.

\* cited by examiner

OFDM COMMUNICATIONS SYSTEM WITH METHOD FOR DETERMINATION OF SUBCARRIER OFFSET FOR OFDM SYMBOL GENERATION

CROSS-REFERENCE TO RELATED APPLICATIONS

This application is a continuation of U.S. patent application Ser. No. 16/553,838 filed on Aug. 28, 2019, now U.S. Pat. No. 11,070,411 issued on Jul. 20, 2021, which is a continuation of U.S. patent application Ser. No. 16/199,883 filed on Nov. 26, 2018, now U.S. Pat. No. 10,419,257 issued on Sep. 17, 2019, which claims the benefit of U.S. Provisional Patent Application No. 62/631,144 filed on Feb. 15, 2018, which applications are hereby incorporated by reference in their entireties.

TECHNICAL FIELD

The application relates to communications systems and methods employing orthogonal frequency division multiplexing (OFDM), and to determining subcarrier offset for such systems and methods.

BACKGROUND

Frame structures have been proposed that are flexible in terms of the use of differing numerologies. A numerology is defined as the set of physical layer parameters of the air interface that are used to communicate a particular signal. A numerology is described in terms of at least subcarrier spacing and OFDM symbol duration, and may also be defined by other parameters such as fast Fourier transform (FFT)/inverse (IFFT) length, transmission time slot length, and cyclic prefix (CP) length or duration. In some implementations, the definition of the numerology may also include which one of several candidate waveforms is used to communicate the signal. Possible waveform candidates may include, but are not limited to, one or more orthogonal or non-orthogonal waveforms selected from the following: Orthogonal Frequency Division Multiplexing (OFDM), Filtered OFDM (f-OFDM), Filter Bank Multicarrier (FBMC), Universal Filtered Multicarrier (UFMC), Generalized Frequency Division Multiplexing (GFDM), Single Carrier Frequency Division Multiple Access (SC-FDMA), Low Density Signature Multicarrier Code Division Multiple Access (LDS-MC-CDMA), Wavelet Packet Modulation (WPM), Faster Than Nyquist (FTN) Waveform, low Peak to Average Power Ratio Waveform (low PAPR WF), Pattern Division Multiple Access (PDMA), Lattice Partition Multiple Access (LPMA), Resource Spread Multiple Access (RSMA), and Sparse Code Multiple Access (SCMA).

These numerologies may be scalable in the sense that subcarrier spacings of different numerologies are multiples of each other, and time slot lengths of different numerologies are also multiples of each other. Such a scalable design across multiple numerologies provides implementation benefits, for example scalable total OFDM symbol duration in a time division duplex (TDD) context.

Table 1 below shows the parameters associated with some example numerologies, in the four columns under "Frame structure". Frames can be configured using one or a combination of the four scalable numerologies. For comparison purposes, in the right hand column of the table, the conventional fixed LTE numerology is shown. The first column is for a numerology with 60 kHz subcarrier spacing, which also has the shortest OFDM symbol duration because OFDM symbol duration varies inversely with subcarrier spacing. This may be suitable for ultra-low latency communications, such as Vehicle-to-Any (V2X) communications. The second column is for a numerology with 30 kHz subcarrier spacing. The third column is for a numerology with 15 kHz subcarrier spacing. This numerology may have the same or similar configuration as in LTE. This may be suitable for broadband services. The fourth column is for a numerology with 7.5 kHz spacing, which also has the longest OFDM symbol duration among the four numerologies. This may be useful for coverage enhancement and broadcasting. Additional uses for these numerologies will be or become apparent to persons of ordinary skill in the art. Of the four numerologies listed, those with 30 kHz and 60 kHz subcarrier spacings are more robust to Doppler spreading (fast moving conditions), because of the wider subcarrier spacing. It is further contemplated that different numerologies may use different values for other physical layer parameters, such as the same subcarrier spacing and different cyclic prefix lengths.

It is further contemplated that other subcarrier spacings may be used, such as higher or lower subcarrier spacings. As illustrated in the example above, the subcarrier spacing of each numerology (7.5 kHz, 15 kHz, 30 kHz, 60 kHz) can be a factor of $2^n$ times the smallest subcarrier spacing, where n is an integer. Larger subcarrier spacings that are also related by a factor of $2^n$, such as 120 kHz, may also or alternatively be used. Smaller subcarrier spacings that are also related by a factor of $2^n$, such as 3.75 kHz, may also or alternatively be used. The symbol durations of the numerologies may also be related by a factor of $2^n$. Two or more numerologies that are related in this way are sometimes referred to as scalable numerologies.

In other examples, a more limited scalability may be implemented, in which two or more numerologies all have subcarrier spacings that are integer multiples of the smallest subcarrier spacing, without necessarily being related by a factor of $2^n$. Examples include 15 kHz, 30 kHz, 45 kHz, 60 kHz, 120 kHz subcarrier spacings.

In still other examples, non-scalable subcarrier spacings may be used, which are not all integer multiples of the smallest subcarrier spacing, such as 15 kHz, 20 kHz, 30 kHz, 60 kHz.

TABLE 1

Example set of Numerologies

| Parameters | Frame structure | | | | Baseline (LTE) |
|---|---|---|---|---|---|
| time slot Length | 0.125 ms | 0.25 ms | 0.5 ms | 1 ms | TTI = 1 ms |
| Subcarrier spacing | 60 kHz | 30 kHz | 15 kHz | 7.5 kHz | 15 kHz |
| FFT size | 512 | 1024 | 2048 | 4096 | 2048 |
| Symbol duration | 16.67 µs | 33.33 µs | 66.67 µs | 133.33 µs | 66.67 µs |

In the example set of numerologies shown in Table 1, different cyclic prefix lengths can further be used in different numerologies having the same subcarrier spacing.

It should be understood that the specific numerologies of the examples of Table 1 are for illustration purposes, and that a flexible frame structure combining other numerologies can alternatively be employed.

OFDM-based signals can be employed to transmit a signal in which multiple numerologies coexist simultaneously. More specifically, multiple sub-band OFDM signals can be generated in parallel, each within a different sub-band, and each sub-band having a different subcarrier spacing (and more generally with a different numerology). The multiple sub-band signals are combined into a single signal for transmission, for example for downlink transmissions. Alternatively, the multiple sub-band signals may be transmitted from separate transmitters, for example for uplink transmissions from multiple electronic devices (EDs), which may be user equipments (UEs). In a specific example, filtered OFDM (f-OFDM) can be employed by using filtering to shape the frequency spectrum of each sub-band OFDM signal, thereby producing a frequency localized waveform, and then combining the sub-band OFDM signals for transmission. f-OFDM lowers out-of-band emission and improves transmission, and addresses the non-orthogonality introduced as a result of the use of different subcarrier spacings. Alternatively, a different approach can be used to achieve a frequency localized waveform, such as windowed OFDM (W-OFDM).

The use of different numerologies can allow the coexistence of a diverse set of use cases having a wide range quality of service (QoS) requirements, such as different levels of latency or reliability tolerance, as well as different bandwidth or signaling overhead requirements. In one example, the base station can signal to the ED an index representing a selected numerology, or a single parameter (e.g., subcarrier spacing) of the selected numerology. The signaling can be done in a dynamic or a semi-static manner, for example in a control channel such as the physical downlink control channel (PDCCH) or in downlink control information (DCI). Based on this signaling, the ED may determine the parameters of the selected numerology from other information, such as a look-up table of candidate numerologies stored in memory.

Resource blocks for each numerology may be transmitted on a grid. The grids for various numerologies are nested, in the sense that for a first numerology with a subcarrier spacing X, and a second numerology with a subcarrier spacing 2X, each RB on the grid with subcarrier spacing 2X will be aligned with two RBs on the grid with subcarrier spacing X. For each numerology there is a set of usable RBs on the respective grid having a middle subcarrier with a middle subcarrier frequency. In general, due to the nested structure of the RB grids, the middle subcarrier frequencies of usable RB ranges of different numerologies may not be aligned with each other.

Accordingly, the middle subcarrier of the baseband OFDM signal of each numerology may need to be shifted appropriately with respect to other numerologies to comply with the nested grid. These shifts can be signaled to the UE with an associated overhead.

SUMMARY

The methods provided result in a reduced overhead for OFDM communication. Reduced overhead can translate into increased bandwidth for the system, and/or reduced power/battery consumption in the LTE.

According to one aspect of the present disclosure, there is provided a method comprising: generating, by a transmitter, an orthogonal frequency division multiplexing (OFDM) signal associated with a first subcarrier spacing of a first numerology ($\mu$), a middle subcarrier frequency of a set of usable resource blocks (RBs) of the first numerology being offset from a carrier frequency by a first offset having a value ($k_{0,x}^{\mu}$) in units of subcarriers, the value of the first offset being defined by $$k_{0,x}^{\mu} = (N_{grid,x}^{start,\mu} + N_{grid,x}^{size,\mu}/2)N_{sc}^{RB} - (N_{grid,x}^{start,\mu_0} + N_{grid,x}^{size,\mu_0}/2)N_{sc}^{RB}2^{\mu_0-\mu}$$

where: x is a channel direction, either "DL" for downlink or "UL" for uplink, $\mu_0$ is a reference numerology associated with a reference subcarrier spacing, $N_{grid,x}^{start,\mu}$ is a value of a second offset from a defined reference point to a start of the set of usable RBs for the first numerology $\mu$, in units of RBs, in the channel direction x, $N_{grid,x}^{size,\mu}$ is a number of RBs in the set of usable RBs for the first numerology $\mu$, in the channel direction x, $N_{grid,x}^{start,\mu_0}$ is a value of a third offset from the defined reference point to a start of a set of usable RBs for the reference numerology $\mu_0$, in units of RBs, in the channel direction x, $N_{grid,x}^{size,\mu_0}$ is a number of RBs in the set of usable RBs for the reference numerology $\mu_0$, in the channel direction x; and transmitting, by the transmitter, the OFDM signal according to the first subcarrier spacing and the first offset.

Optionally, the reference numerology is predefined.

Optionally, any one of the value of the second offset ($N_{grid,x}^{start,\mu}$), the number of RBs in the set of usable RBs for the first numerology ($N_{grid,x}^{size,\mu}$), the value of the third offset ($N_{grid,x}^{start,\mu_0}$), or the number of RBs in the set of usable RBs for the reference numerology ($N_{grid,x}^{size,\mu_0}$), is previously signalled to the transmitter.

Optionally, the OFDM signal is a physical random-access channel (PRACH) signal.

Optionally, the first subcarrier spacing is any one of 15 kHz, 30 kHz, 60 kHz, 120 kHz, or 240 kHz.

Optionally, the transmitter is used in a base station.

Optionally, the transmitter is used in a user equipment.

According to another aspect of the present disclosure, there is provided a method comprising: receiving, by a receiver, an orthogonal frequency division multiplexing (OFDM) signal associated with a first subcarrier spacing of a first numerology ($\mu$), a middle subcarrier frequency of a set of usable resource blocks (RBs) of the first numerology being offset from a carrier frequency by a first offset having a value ($k_{0,x}^{\mu}$) in units of subcarriers, the value of the first offset being defined by $$k_{0,x}^{\mu} = (N_{grid,x}^{start,\mu} + N_{grid,x}^{size,\mu}/2)N_{sc}^{RB} - (N_{grid,x}^{start,\mu_0} + N_{grid,x}^{size,\mu_0}/2)N_{sc}^{RB}2^{\mu_0-\mu}$$

where: x is a channel direction, either "DL" for downlink or "UL" for uplink, $\mu_0$ is a reference numerology associated with a reference subcarrier spacing, $N_{grid,x}^{start,\mu}$ is a value of a second offset from a defined reference point to a start of the set of usable RBs for the first numerology $\mu$, in units of RBs, in the channel direction x, $N_{grid,x}^{size,\mu}$ is a number of RBs in the set of usable RBs for the first numerology $\mu$, in the channel direction x, $N_{grid,x}^{start,\mu_0}$ is a value of a third offset from the defined reference point to a start of a set of usable RBs for the reference numerology $\mu_0$, in units of RBs, in the channel direction x, $N_{grid,x}^{size,\mu_0}$ is a number of RBs in the set of usable RBs for the reference numerology $\mu_0$, in the channel direction x; and decoding, by the receiver, the OFDM signal according to the first subcarrier spacing and the first offset.

Optionally, the reference numerology is predefined.

Optionally, any one of the value of the second offset ($N_{grid,x}^{start,\mu}$), the number of RBs in the set of usable RBs for the first numerology ($N_{grid,x}^{size,\mu}$), the value of the third offset ($N_{grid,x}^{start,\mu_0}$), or the number of RBs in the set of usable RBs for the reference numerology ($N_{grid,x}^{size,\mu_0}$), is previously signalled to the transmitter.

Optionally, the OFDM signal is a physical random-access channel (PRACH) signal.

Optionally, the first subcarrier spacing is any one of 15 kHz, 30 kHz, 60 kHz, 120 kHz, or 240 kHz.

Optionally, the receiver is used in a base station.

Optionally, the receiver is used in a user equipment.

According to another aspect of the present disclosure, there is a transmitter comprising: a non-transitory memory for storing instructions; and one or more processing units in communication with the non-transitory memory, for executing the instructions to: generate an orthogonal frequency division multiplexing (OFDM) signal associated with a first subcarrier spacing of a first numerology (μ), a middle subcarrier frequency of a set of usable resource blocks (RBs) of the first numerology being offset from a carrier frequency by a first offset having a value ($k_{0,x}^\mu$) in units of subcarriers, the value of the first offset being defined by $$k_{0,x}^\mu = (N_{grid,x}^{start,\mu} + N_{grid,x}^{size,\mu}/2)N_{sc}^{RB} - (N_{grid,x}^{start,\mu_0} + N_{grid,x}^{size,\mu_0}/2)N_{sc}^{RB} 2^{\mu_0-\mu}$$

where: x is a channel direction, either "DL" for downlink or "UL" for uplink, $\mu_0$, is a reference numerology associated with a reference subcarrier spacing, $N_{grid,x}^{start,\mu}$ is a value of a second offset from a defined reference point to a start of the set of usable RBs for the first numerology μ, in units of RBs, in the channel direction x, $N_{grid,x}^{size,\mu}$ is a number of RBs in the set of usable RBs for the first numerology μ, in the channel direction x, $N_{grid,x}^{start,\mu_0}$ is a value of a third offset from the defined reference point to a start of a set of usable RBs for the reference numerology $\mu_0$, in units of RBs, in the channel direction x, $N_{grid,x}^{size,\mu_0}$ is a number of RBs in the set of usable RBs for the reference numerology $\mu_0$, in the channel direction x; and transmit the OFDM signal according to the first subcarrier spacing and the first offset.

Optionally, the reference numerology is predefined.

Optionally, any one of the value of the second offset ($N_{grid,x}^{start,\mu}$), the number of RBs in the set of usable RBs for the first numerology ($N_{grid,x}^{size,\mu}$), the value of the third offset ($N_{grid,x}^{start,\mu_0}$), or the number of RBs in the set of usable RBs for the reference numerology ($N_{grid,x}^{size,\mu_0}$), is previously signalled to the transmitter.

Optionally, the OFDM signal is a physical random-access channel (PRACH) signal.

Optionally, the first subcarrier spacing is any one of 15 kHz, 30 kHz, 60 kHz, 120 kHz, or 240 kHz.

Optionally, the transmitter is used in a base station.

Optionally, the transmitter is used in a user equipment.

According to another aspect of the present disclosure, there is provided a receiver comprising: a non-transitory memory for storing instructions; and one or more processing units in communication with the non-transitory memory, for executing the instructions to: receive an orthogonal frequency division multiplexing (OFDM) signal associated with a first subcarrier spacing of a first numerology (μ), a middle subcarrier frequency of a set of usable resource blocks (RBs) of the first numerology being offset from a carrier frequency by a first offset having a value ($k_{0,x}^\mu$) in units of subcarriers, the value of the first offset being defined by $$k_{0,x}^\mu = (N_{grid,x}^{start,\mu} + N_{grid,x}^{size,\mu}/2)N_{sc}^{RB} - (N_{grid,x}^{start,\mu_0} + N_{grid,x}^{size,\mu_0}/2)N_{sc}^{RB} 2^{\mu_0-\mu}$$

where: x is a channel direction, either "DL" for downlink or "UL" for uplink, $\mu_0$ is a reference numerology associated with a reference subcarrier spacing, $N_{grid,x}^{start,\mu}$ is a value of a second offset from a defined reference point to a start of the set of usable RBs for the first numerology μ, in units of RBs, in the channel direction x, $N_{grid,x}^{size,\mu}$ is a number of RBs in the set of usable RBs for the first numerology μ, in the channel direction x, $N_{grid,x}^{start,\mu_0}$ is a value of a third offset from the defined reference point to a start of a set of usable RBs for the reference numerology $\mu_0$, in units of RBs, in the channel direction x, $N_{grid,x}^{size,\mu_0}$ is a number of RBs in the set of usable RBs for the reference numerology $\mu_0$, in the channel direction x; and decode the OFDM signal according to the first subcarrier spacing and the first offset.

Optionally, the reference numerology is predefined.

Optionally, any one of the value of the second offset ($N_{grid,x}^{start,\mu}$), the number of RBs in the set of usable RBs for the first numerology ($N_{grid,x}^{size,\mu}$), the value of the third offset ($N_{grid,x}^{start,\mu_0}$), or the number of RBs in the set of usable RBs for the reference numerology ($N_{grid,x}^{size,\mu_0}$), is previously signalled to the transmitter.

Optionally, the OFDM signal is a physical random-access channel (PRACH) signal.

Optionally, the first subcarrier spacing is any one of 15 kHz, 30 kHz, 60 kHz, 120 kHz, or 240 kHz.

Optionally, the receiver is used in a base station.

Optionally, the receiver is used in a user equipment.

BRIEF DESCRIPTION OF THE DRAWINGS

Embodiments of the disclosure will now be described with reference to the attached drawings in which.

DETAILED DESCRIPTION OF ILLUSTRATIVE EMBODIMENTS

Figure 1:
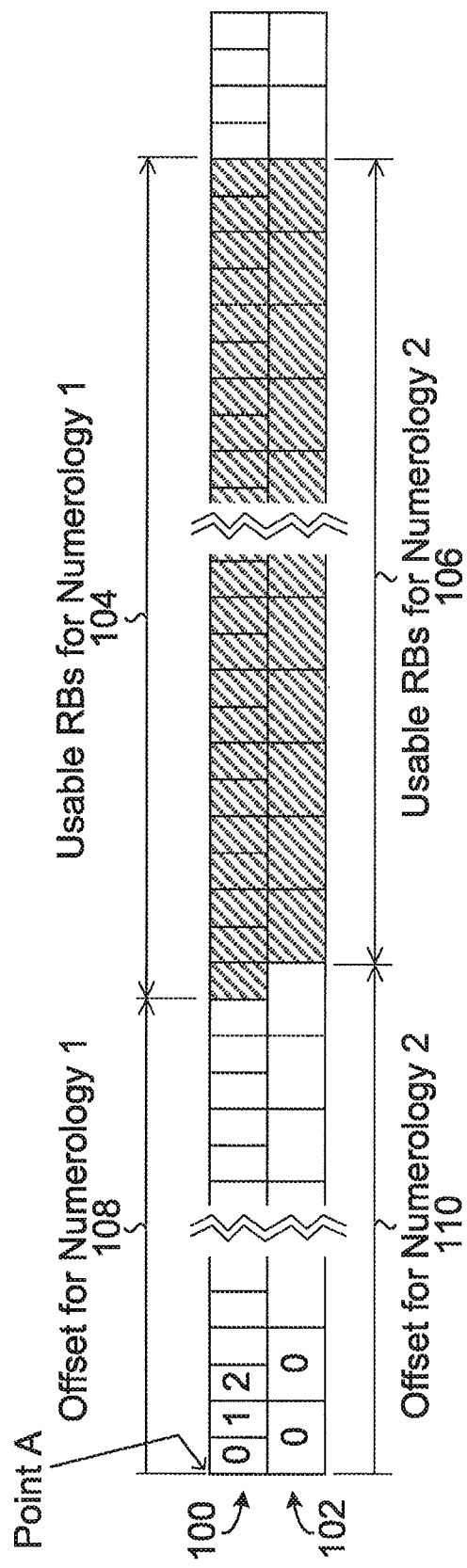
FIG. 1 depicts RB grids for multiple numerologies.

As noted above, a network may support multiple numerologies. Features of a given numerology may include subcarrier spacing and cyclic prefix (CP) type, among others. For example, in 5G NR (5G new radio), hereinafter simply NR, multiple numerologies are supported as specified in the following table (See Table 4.2-1 in 3GPP TS 38.211): "NR; Physical channels and modulation":

TABLE 3

Different numerologies in NR (Table 4.2-1 in TS 38.211)

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In NR, in frequency range (FR) 1 (below 6 GHz), the first three numerologies in the above table are supported, and in FR2 (above 6 GHz), the last three numerologies in the above table are supported by the network. The exact values for the frequency ranges FR1 and FR2 are specified in TS38.104 as follows (See Table 5.1-1 in TS 38.104): "NR; Base station (BS) radio transmission and reception":

TABLE 4

Definition of frequency ranges in NR (Table 5.1-1 in TS 38.104)

| Frequency range designation | Corresponding frequency range |
|---|---|
| $FR_1$ | 450 MHz-6000 MHz |
| $FR_2$ | 24250 MHz-52600 MHz |

Specific examples are provided below that are specific to the frequency range definitions and numerologies specified above, the embodiments provided herein have more general application to nested sets of numerologies.

For all channels except the physical random-access channel (PRACH), the OFDM baseband signal generation formula is specified per numerology in TS 38.211 as follows:

The time-continuous signal $s_l^{(p,\mu)}(t)$ on antenna port p and subcarrier spacing configuration μ for OFDM symbol l in a subframe for any physical channel or signal except PRACH is defined by:

$$s_l^{(p,\mu)}(t) = \sum_{k=0}^{N_{grid}^{size,\mu} N_{sc}^{RB}-1} a_{k,l}^{(p,\mu)} \cdot e^{j2\pi(k+k_0^\mu - N_{grid}^{size,\mu} N_{sc}^{RB}/2)\Delta f(t-N_{CP,l}^\mu T_c - t_{start,l}^\mu)}$$

where $t_{start,l}^\mu \leq t < t_{start,l}^\mu + (N_u^\mu + N_{CP,l}^\mu)T_c$ is the time within the subframe $$N_u^\mu = 2048\kappa \cdot 2^{-\mu}$$

$$N_{CP,l}^\mu = \begin{cases} 512\kappa \cdot 2^{-\mu} & \text{extended cyclic prefix} \\ 144\kappa \cdot 2^{-\mu} + 16\kappa & \text{normal cyclic prefix, } l = 0 \text{ or } l = 7 \cdot 2^\mu \\ 144\kappa \cdot 2^{-\mu} & \text{normal cyclic prefix, } l \neq 0 \text{ and } l \neq 7 \cdot 2^\mu \end{cases}$$

Δf is given by clause 4.2, and μ is the subcarrier spacing configuration. The starting position of OFDM symbol l for subcarrier spacing configuration μ in a subframe is given by $$t_{start,l}^\mu = \begin{cases} 0 & l = 0 \\ t_{start,l-1}^\mu + (N_u^\mu + N_{CP,l-1}^\mu) \cdot T_c & \text{otherwise} \end{cases}$$

The value of $k_0^\mu$ is obtained from the higher-layer parameter k0 and is such that the lowest numbered subcarrier in a common resource block for subcarrier spacing configuration μ coincides with the lowest numbered subcarrier in a common resource block for any subcarrier spacing configuration less than μ.

For PRACH the OFDM baseband signal generation formula is specified per numerology in TS 38.211 as follows:

The time-continuous signal $s_l^{(p,\mu)}(t)$ on antenna port p for PRACH is defined by $$s_l^{(p,\mu)}(t) = \sum_{k=0}^{L_{RA}-1} a_{k,l}^{(p,RA)} \cdot e^{j2\pi(k+Kk_1+\bar{k})\Delta f_{RA}(t-N_{CP,l}^{RA}T_c - t_{start}^{RA})}$$

$$K = \Delta f / \Delta f_{RA}$$

$$k_1 = k_0^\mu + N_{BWP,i}^{start} N_{sc}^{RB} + n_{RA}^{start} N_{sc}^{RB} + n_{RA} N_{RB}^{RA} N_{sc}^{RB} - N_{grid}^{size,\mu} N_{sc}^{RB}/2$$

where $t_{start}^{RA} \leq t < t_{start}^{RA} + (N_u + N_{CP,l}^{RA})T_c$ and $k_0^\mu$ is obtained from the higher-layer parameter k0 and is such that the lowest numbered subcarrier in a common resource block for subcarrier spacing configuration μ coincides with the lowest numbered subcarrier in a common resource block for any subcarrier spacing configuration less than μ.

Other parameters in the formula are described in TS 38.211.

The modulation and upconversion to the carrier frequency $f_0$ is specified per numerology in TS38.211 as follows:

Modulation and upconversion to the carrier frequency $f_0$ of the complex-valued OFDM baseband signal for antenna port p, subcarrier spacing configuration μ, and OFDM symbol l in a subframe assumed to start at t=0 is given by $$\text{Re}\left\{s_l^{(p,\mu)}(t) \cdot e^{j2\pi f_0\left(t-t_{start,l}^\mu - N_{CP,l}^\mu T_c\right)}\right\}$$

for all channels and signals except PRACH and by $$\text{Re}\{s_l^{(p,\mu)}(t) \cdot e^{j2\pi f_0 t}\}$$

for PRACH.

Figure 2:
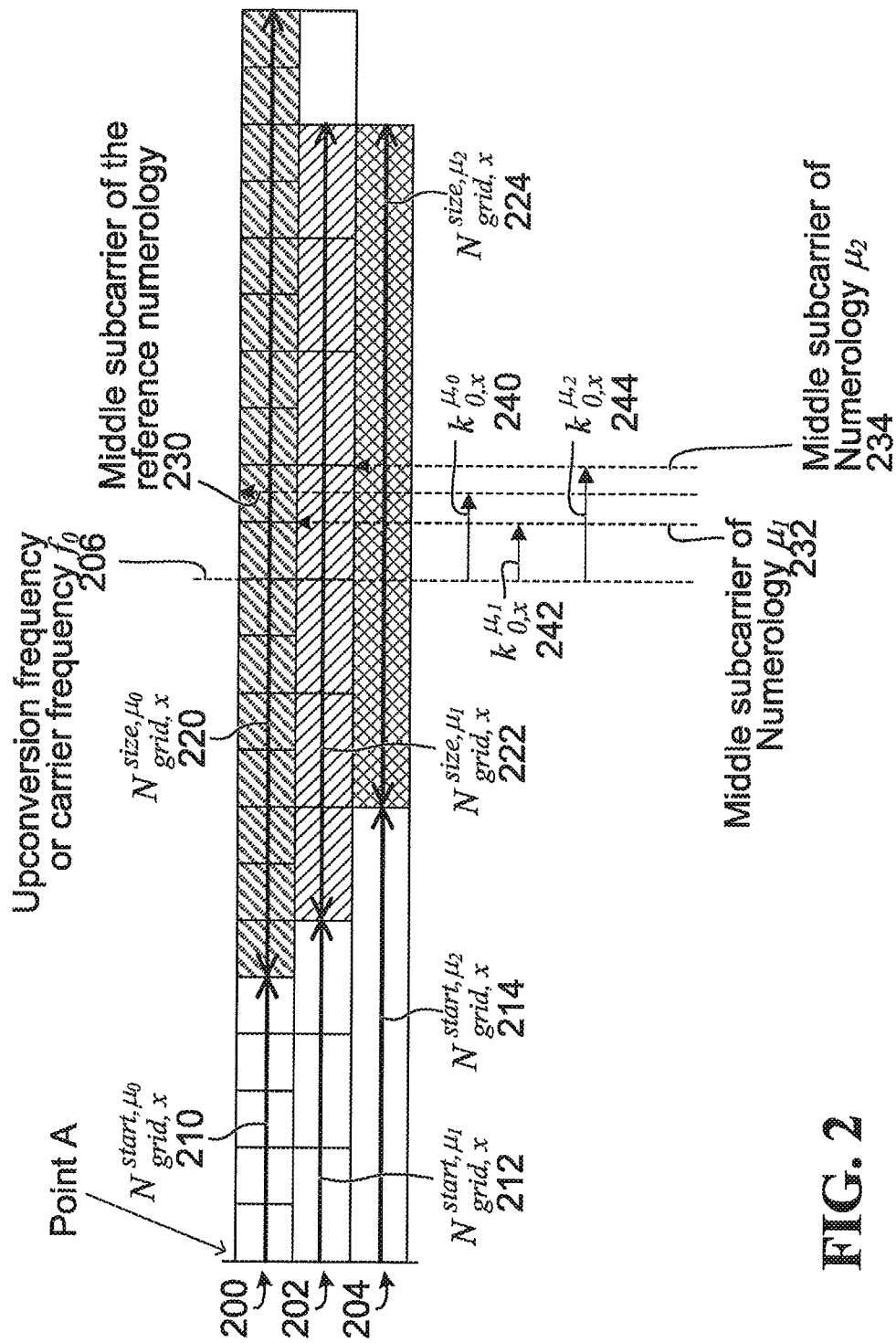
FIG. 2 depicts an offset in middle subcarrier location for multiple numerologies.

Referring now to FIG. 2, shown is an example of resource block (RB) grids, or simply, resource grids of two numerologies, numerology 1 and numerology 2, generally indicated at 100,102. The two grids are nested in that two RBs on grid 100 are aligned with one PRB on grid 102. This is an example of a nested structure of PRB grids of different numerologies. For each numerology, each RB is defined as a number of consecutive subcarriers in the frequency domain. Each grid defines a set of RB locations starting at a common reference point, referred to as "Point A" in FIG. 1. The RBs within the resource grid of each numerology are also called common resource blocks (CRBs). The center of first subcarrier of the first RB in the grid for each numerology coincides with Point A. For an implementation in which the RBs are numbered from 0 and upwards and the subcarriers within each RB are numbered from 0 and upwards, the center of subcarrier #0 of RB #0 in the grid for each numerology coincides with Point A. For each of the numerologies, there is a set of usable RBs. The usable RBs 104 for numerology 1 are offset by an offset 108, and the usable RBs 106 for numerology 2 are offset by an offset 110. Point A is typically outside the range of the usable RBs.

Each set of usable RBs has a middle subcarrier having a middle subcarrier frequency. For an implementation in which all RBs have $N_{sc}^{RA}=12$ subcarriers, when the number of resource blocks is an even number 2N, this middle subcarrier frequency is defined as the first subcarrier of the N+1$^{st}$ RB. In this case, for an implementation in which the RBs are numbered from 0 and upwards and the subcarriers within each RB are numbered from 0 and upwards, this middle subcarrier frequency is defined as subcarrier #0 of the RB #N. When the number of resource blocks is an odd number 2N+1, this middle subcarrier frequency is defined as the seventh subcarrier of the N+1$^{st}$ RB. In this case, for an implementation in which the RBs are numbered from 0 and upwards and the subcarriers within each RB are numbered from 0 and upwards, this middle subcarrier frequency is defined as subcarrier #6 of the RB #N.

In general, due to the nested structure of the RB grids, the middle subcarrier frequencies of usable RB ranges of different numerologies may not be aligned with each other. This is the case for the example of FIG. 1, where it can be seen that the middle subcarrier frequencies of usable RBs 104,106 are offset from each other.

Accordingly, the middle subcarrier of the baseband OFDM signal of each numerology may need to be shifted appropriately with respect to other numerologies to comply with the nested grid. The parameter $k_0^\mu$ is the value of subcarrier shift for numerology $\mu$. Through proper configuration of the parameter $k_0^\mu$ for each numerology, baseband signals for each numerology, after up conversion to carrier frequency $f_0$, will have offset middle subcarrier frequencies such that the required RB nesting is achieved.

In 3GPP Agreement in RAN1 #91 meeting, it is proposed to signal a value for $k_0$ for each numerology. Depending on the location and range of usable RBs for each numerology, the range of possible values for $k_0$ can be very large. It would be desirable to avoid or reduce the overhead in informing a user equipment (UE) of the value of $k_0$ for each subcarrier spacing.

OFDM communications systems and methods are provided. Systems and methods for determining, and in some embodiments indicating, $k_0^\mu$ are provided. These methods can be implemented in the transmitter (base station (BS) and/or UE) to derive the value of $k_0^\mu$ for use in generating and transmitting OFDM signals. The receiver (UE and/or BS) may also use the value of $k_0^\mu$ to decode a received OFDM signal.

While the detailed examples focus on indicating, $k_0^\mu$ for the specific OFDM signals specified above, more generally, the provided methods are not limited to this case, and can more generally be used to determine an offset between a middle subcarrier frequency of a set of usable resource blocks of a numerology and the carrier frequency.

Some embodiments may include signaling from the BS of a parameter related to $k_0^\mu$, prior to the derivation of $k_0^\mu$. Different UE transmitter embodiments use different forms of signaling (or no signaling) to determine the value of $k_0^\mu$.

In accordance with an embodiment of the invention, one of a set of numerologies is taken as a reference numerology, for which the value of $k_0^\mu$ is either set to zero, set to another predefined value, or explicitly signaled. The value of $k_0^\mu$ for a given numerology other than the reference numerology is derived from the value of $k_0^\mu$ for the reference numerology together with one or more other parameters for both the given and reference numerologies. In a specific example, these other parameters include the offset from point A described above with reference to FIG. 1, and the bandwidth of the usable RBs.

Determination of $k_0^\mu$

As indicated above, one of the supported numerologies is designated as the reference numerology. Various possible methods of selecting and/or configuring the reference numerology are detailed below. The reference numerology is denoted by $\mu_0$. Denote by $k_{0,x}^{\mu_0}$ the value of the subcarrier shift for the reference numerology $\mu_0$ in the channel direction x, where x is either "DL" or "UL". For a given numerology $\mu$, the value of $k_{0,x}^\mu$ is obtained from $k_{0,x}^{\mu_0}$ using the following formula:

$$k_{0,x}^\mu = n_{0,x}^\mu + (k_{0,x}^{\mu_0} - n_{0,x}^{\mu_0})2^{\mu_0-\mu},$$

where $n_{0,x}^\mu := (N_{grid,x}^{start,\mu} + N_{grid,x}^{size,\mu}/2)N_{sc}^{RB}$ is the subcarrier offset from point A to the middle subcarrier of the usable RBs of numerology $\mu$, where $N_{grid,x}^{start,\mu}$ is the offset from point A to the start of the usable RBs for numerology $\mu$ in the channel direction x in units of RBs, and $N_{grid,x}^{size,\mu}$ is the number of RBs in the usable RBs for the numerology $\mu$ in the channel direction x. $n_{0,x}^{\mu_0}$ is the value of $n_{0,x}^\mu$ for the reference numerology defined by $n_{0,x}^{\mu_0} := (N_{grid,x}^{start,\mu_0} + N_{grid,x}^{size,\mu_0}/2)N_{sc}^{RB}$ FIG. 2 illustrates a specific example for a set of three numerologies. Shown are RB grids 200,202,204 for numerologies $\mu_0$ (the reference numerology), $\mu_0+1$, $\mu_0+2$ having respective offsets 210,212,214 from point A to respective usable RBs 220,222,224. The upconversion frequency or carrier frequency is indicated at 206. The middle subcarrier of the reference numerology is indicated at 230, and the middle subcarriers for numerologies $\mu_0+1$, $\mu_0+2$ are indicated at 232,234 respectively. Also shown is the subcarrier shift 240 $k_{0,x}^{\mu_0}$ for the reference numerology, and the subcarrier shifts 242 $k_{0,x}^{\mu_0+1}$, 244 $k_{0,x}^{\mu_0+2}$ respectively.

For use in the formula provided above, the values of $k_{0,x}^{\mu_0}$ and $\mu_0$ may be redefined or explicitly signaled.

Methods of Specifying $\mu_0$

Various different methods of specifying $\mu_0$ are provided.

First Method Reference Numerology $\mu_0$ is Predefined

In some embodiments, the reference numerology $\mu_0$ is predefined. An advantage of this approach is that no higher layer signaling is required for indication of the reference numerology. In a specific example of this approach $\mu_0$ is the numerology with the lowest subcarrier spacing supported in the carrier or frequency range.

For example, the lowest subcarrier spacing supported in the carrier is predefined for the carrier and may depend on the carrier bandwidth or frequency band of the carrier or both. For example, with this approach, $\mu_0=0$ and $\mu_0=2$ are taken as the respective reference numerologies for FR1 and FR2, respectively. The parameter $k_{0,x}^\mu$ for this example is obtained using $$k_{0,x}^\mu = n_{0,x}^\mu + (k_{0,x}^0 - n_{0,x}^0)2^{-\mu}, \text{ for FR1}$$

$$k_{0,x}^\mu = n_{0,x}^\mu + (k_{0,x}^2 - n_{0,x}^2)2^{-\mu}, \text{ for FR2}$$

Second Method: Reference Numerology $\mu_0$ is the Numerology of Another Channel or Transmission In some embodiments, the reference numerology $\mu_0$ is the numerology of another channel or transmission. An advantage of this approach is that no higher layer signaling is required for indication of the reference numerology. In a specific example, the reference numerology is the same as that used to transmit remaining system information (RMSI). The numerology of this other channel/transmission may be provided from a higher layer parameter. In a specific example, the higher layer parameter is the subcarrier spacing of the RMSI signaled as subCarrierSpacingCommon, from which can be obtained the numerology $\mu_{RMSI}$ of the RMSI. The parameter $k_{0,x}^\mu$ for this example is obtained using $$k_{0,x}^\mu = n_{0,x}^\mu + (k_{0,x}^{\mu_{RMSI}} - n_{0,x}^{\mu_{RMSI}}) 2^{\mu_{RMSI}-\mu}$$

Third Method: Reference Numerology $\mu_0$ is up to UE Implementation

In some embodiments, the reference numerology $\mu_0$ is up to UE implementation and can be chosen to be any of the supported numerologies in the carrier or any of the supported numerologies in the frequency range. An advantage of this approach is that no higher layer signaling is required for indication of the reference numerology.

Fourth Method: The Reference Numerology $\mu_0$ is Signaled to UE

In some embodiments, the reference numerology $\mu_0$ is signaled to the UE, for example through higher layer signaling.

Methods of Specifying $k_0^{\mu_0}$

Various different methods of specifying $k_0^{\mu_0}$ are provided.

First Method: $k_{0,x}^{\mu_0}$ is Predefined

In some embodiments, $k_{0,x}^{\mu_0}$ is predefined. With this approach, no higher layer signaling is required for indication of $k_{0,x}^{\mu_0}$. In a specific example, $k_{0,x}^{\mu_0}=0$. In this case, the parameter $k_{0,x}^\mu$ for this example is obtained for other numerologies using $$k_{0,x}^\mu = n_{0,x}^\mu - n_{0,x}^{\mu_0} 2^{\mu_0-\mu}$$

In a second example, $k_{0,x}^{\mu_0}=6$, and in a third example, $k_{0,x}^{\mu_0}=6$.

Figure 3:
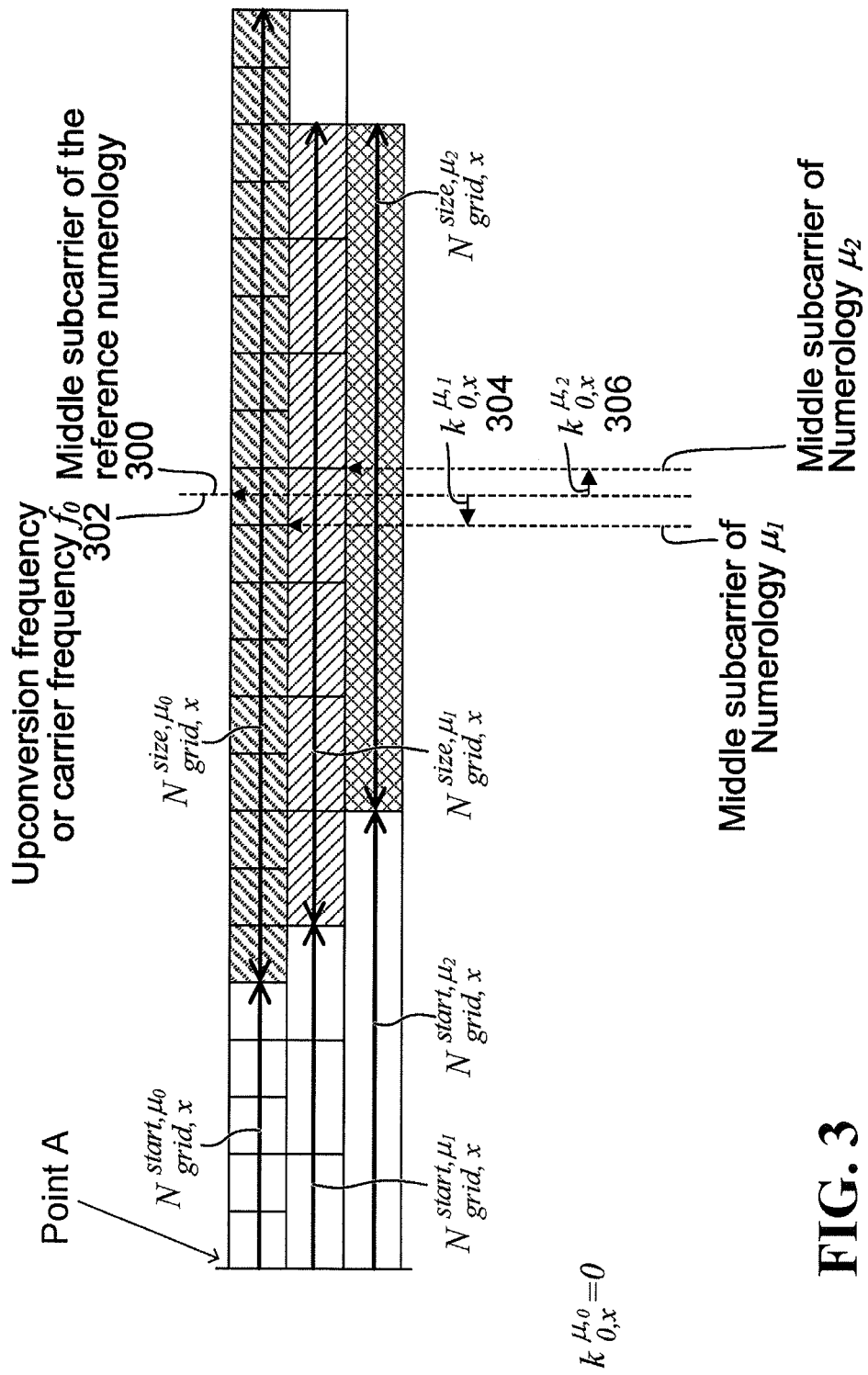
FIG. 3 depicts an offset in middle subcarrier location for multiple numerologies, including an offset of 0 for a reference numerology.

FIG. 3 illustrates this specific example where $k_{0,x}^{\mu_0}=0$ is predefined. It can be seen that since $k_{0,x}^{\mu_0+1}=0$, the middle subcarrier 300 for numerology $\mu_0$ is aligned with the upconversion frequency $f_0$ 302 and the other two numerologies have respective offsets 304,306 given by the above equation.

Second Method: The Value of $k_{0,x}^{\mu_0}$ is up to UE Implementation

In some embodiments, the value of $k_{0,x}^{\mu_0}$ is up to UE implementation. With this approach, no higher layer signaling for indication of $k_{0,x}^{\mu_0}$.

In a first specific example, $k_{0,x}^{\mu_0} \in \{-6,0,6\}$, according to UE implementation.

In a second specific example, $k_{0,x}^{\mu_0} \in \{0,6\}$, according to UE implementation.

In a third specific example, $k_{0,x}^{\mu_0} \in \{-6,0\}$, according to UE implementation.

Third Method: The Value of $k_{0,x}^{\mu_0}$ is Signaled to the UE through Higher Layer Signaling In some embodiments, the value of $k_{0,x}^{\mu_0}$ is signaled to the UE through higher layer signaling.

In a first specific example, $k_{0,x}^{\mu_0} \in \{-6,0,6\}$, which requires 2 bits of higher layer signaling.

In a second specific example, $k_{0,x}^{\mu_0} \in \{6,0\}$, which requires 1 bit of higher layer signaling.

In a second specific example, $k_{0,x}^{\mu_0} \in \{-6,0\}$, which requires 1 bit of higher layer signaling.

It should be noted that any of the methods of determining $\mu_0$ can be combined with any of the methods for determining $k_{0,x}^{\mu_0}$.

In a specific embodiment, the numerology with the lowest subcarrier spacing supported in a carrier or frequency range is predefined to be designated as the reference numerology $\mu_0$, and $k_{0,x}^{\mu_0}$ is predefined to be 0. With these selections, the equation above for the parameter $k_{0,x}^\mu$ can be simplified to $$k_{0,x}^\mu = n_{0,x}^\mu - n_{0,x}^{\mu_0} 2^{\mu_0-\mu},$$

where $n_{0,x}^\mu := (N_{grid,x}^{start,\mu} + N_{grid,x}^{size,\mu}/2) N_{sc}^{RB}$ This specific approach has the advantage that no higher layer signaling for indication of either of $\mu_0$ or $k_{0,x}^\mu$ for any numerology and any channel direction x In some embodiments, frequency division duplexing is employed to separate uplink from downlink transmissions. In some embodiments the values of $\mu_0$ and/or $k_0^{\mu_0}$ are independently set for uplink and downlink and the values of $k_{0,x}^\mu$ are obtained using the previously introduced formula:

$$k_{0,x}^\mu = n_{0,x}^\mu + (k_{0,x}^{\mu_0} - n_{0,x}^{\mu_0}) 2^{\mu_0-\mu},$$

Figure 4A:
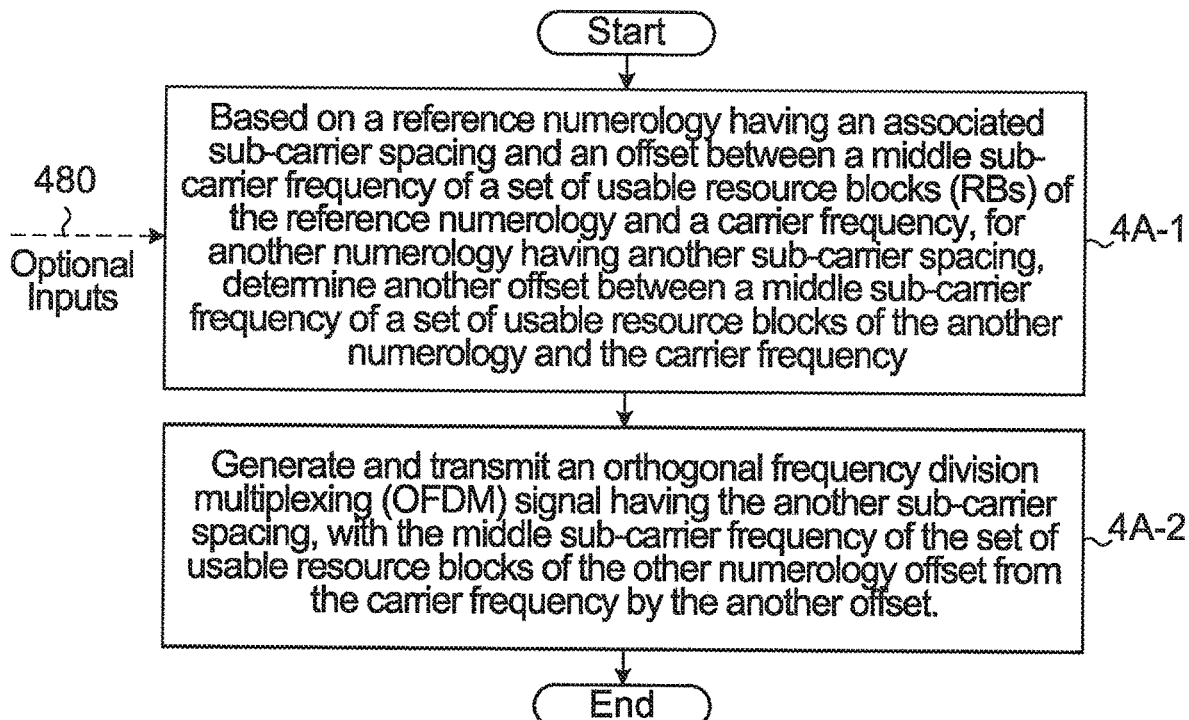
FIGS. 4A and 5A are flowcharts of methods of determining and using offsets in middle subcarrier locations.

FIG. 4A is a flowchart of a method provided by an embodiment of the invention. The method of FIG. 4A is from a transmitter perspective. In block 4A-1, based on a reference numerology having an associated subcarrier spacing and an offset between a middle subcarrier frequency of a set of usable resource blocks (RBs) of the reference numerology and a carrier frequency, for another numerology having another subcarrier spacing, another offset is determined between a middle subcarrier frequency of a set of usable resource blocks of the another numerology and the carrier frequency. In block 4A-2, an OFDM signal is generated and transmitted, the signal having the another subcarrier spacing, with the middle subcarrier frequency of the set of usable resource blocks of the other numerology offset from the carrier frequency by the another offset.

Optionally, for the method of FIG. 4A, determining the another offset for the another numerology is further based on one or more other inputs that may have been previously signalled or otherwise determined. These other inputs are indicated at 480 and include one or a combination of:

an offset from a defined reference point to the start of the set of usable RBs for the another numerology;

the number of RBs in the set of usable RBs for the another numerology;

an offset from a defined reference point to the start of the set of usable RBs for the reference numerology; and the number of RBs in the set of usable RBs for the reference numerology.

Figure 5A:
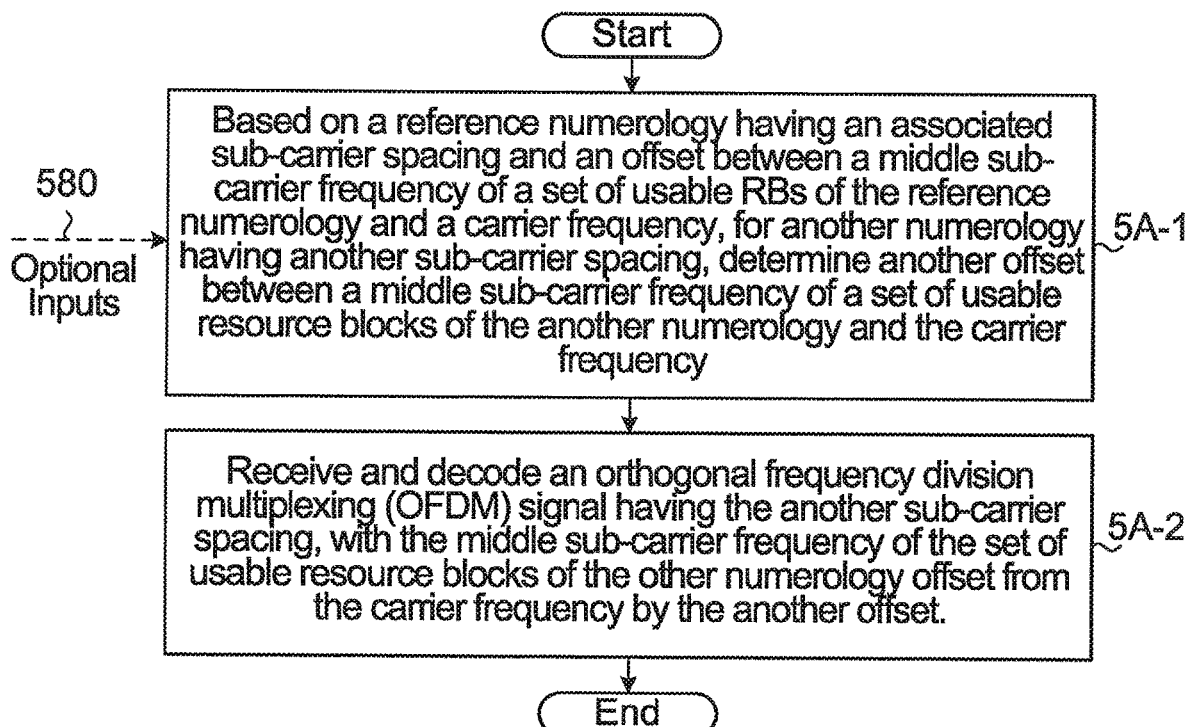

FIG. 5A is a flowchart of a method provided by an embodiment of the invention. The method of FIG. 5A is from a receiver perspective. In block 5A-1, based on a reference numerology having an associated subcarrier spacing and an offset between a middle subcarrier frequency of a set of usable RBs of the reference numerology and a carrier frequency, for another numerology having another subcarrier spacing, another offset is determined between a middle subcarrier frequency of a set of usable resource blocks of the another numerology and the carrier frequency. In block 5A-2, an OFDM signal is received and decoded, the OFDM signal having the another subcarrier spacing, with the middle subcarrier frequency of the set of usable resource blocks of the other numerology offset from the carrier frequency by the another offset.

Optionally, for the method of FIG. 5A, determining the another offset for the another numerology is further based on one or more other inputs that may have been previously signalled or otherwise determined. These other inputs are indicated at 580 and are the same as detailed above in the description of FIG. 4A.

In some embodiments, for the methods of FIG. 4A and/or FIG. 5A:

the reference numerology is predefined; or the reference numerology is the numerology with the smallest subcarrier spacing supported within a given carrier; or the reference numerology is the same as that of another transmission or channel; or the reference numerology is the same as that remaining system information (RMSI) as indicated by higher layer signalling; or the reference numerology is UE implementation specific; or signalling is transmitted or received indicating the reference numerology.

In some embodiments, for the methods of FIG. 4A and/or FIG. 5A:

the offset between the middle subcarrier frequency of the set of usable resource blocks of the reference numerology and the carrier frequency is predefined; or the offset between the middle subcarrier frequency of the set of usable resource blocks of the reference numerology and the carrier frequency is UE implementation specific; or the offset between the middle subcarrier frequency of the set of usable resource blocks of the reference numerology and the carrier frequency is signaled through higher layer signaling.

Figure 4B:
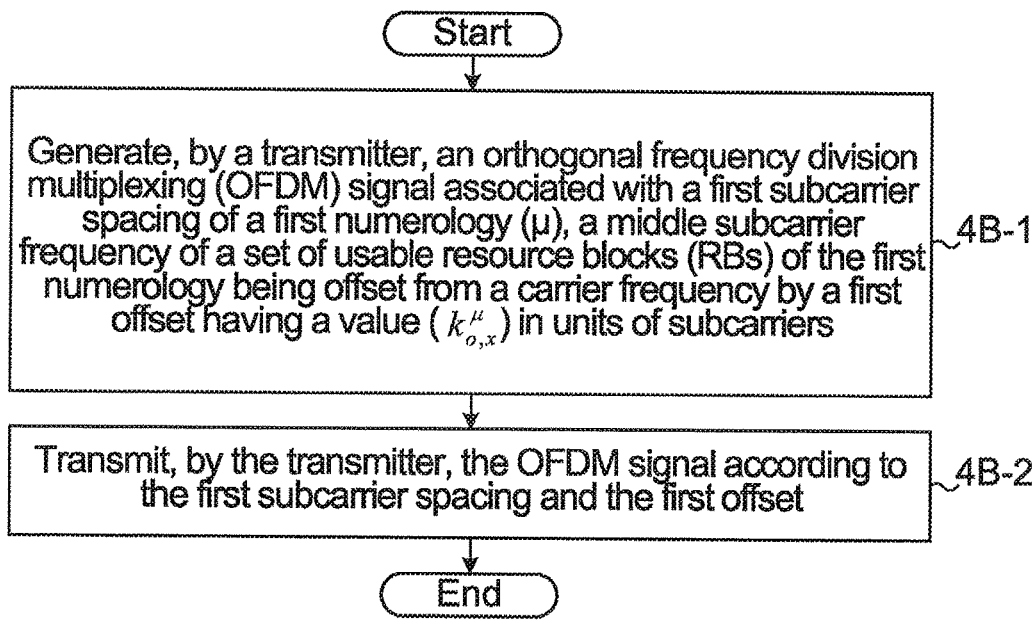
FIGS. 4B and 5B are flowcharts of methods of transmitting and receiving OFDM signals with an offset.

FIG. 4B is a flowchart of a method provided by an embodiment of the invention. The method of FIG. 4B is from a transmitter perspective. The method begins in block 4B-1 with generating, by a transmitter, an orthogonal frequency division multiplexing (OFDM) signal associated with a first subcarrier spacing of a first numerology ($\mu$), a middle subcarrier frequency of a set of usable resource blocks (RBs) of the first numerology being offset from a carrier frequency by a first offset having a value ($k_{0,x}^{\mu}$) in units of subcarriers. The value of the first offset is defined by:

$$k_{0,x}^{\mu} = (N_{grid,x}^{start,\mu} + N_{grid,x}^{size,\mu}/2)N_{sc}^{RB} - (N_{grid,x}^{start,\mu_0} + N_{grid,x}^{size,\mu_0}/2)N_{sc}^{RB}2^{\mu_0-\mu}$$

where:

x is a channel direction, either "DL" for downlink or "UL" for uplink, $\mu_0$ is a reference numerology associated with a reference subcarrier spacing, $N_{grid,x}^{start,\mu}$ is a value of a second offset from a defined reference point to a start of the set of usable RBs for the first numerology $\mu$, in units of RBs, in the channel direction x, $N_{grid,x}^{size,\mu}$ is a number of RBs in the set of usable RBs for the first numerology $\mu$, in the channel direction x, $N_{grid,x}^{size,\mu_0}$ is a value of a third offset from the defined reference point to a start of a set of usable RBs for the reference numerology $\mu_0$, in units of RBs, in the channel direction x $N_{grid,x}^{size,\mu_0}$ is a number of RBs in the set of usable RBs for the reference numerology $\mu_0$, in the channel direction x.

The method continues in blocks 4B-2 with transmitting, by the transmitter, the OFDM signal according to the first subcarrier spacing and the first offset.

Figure 5B:
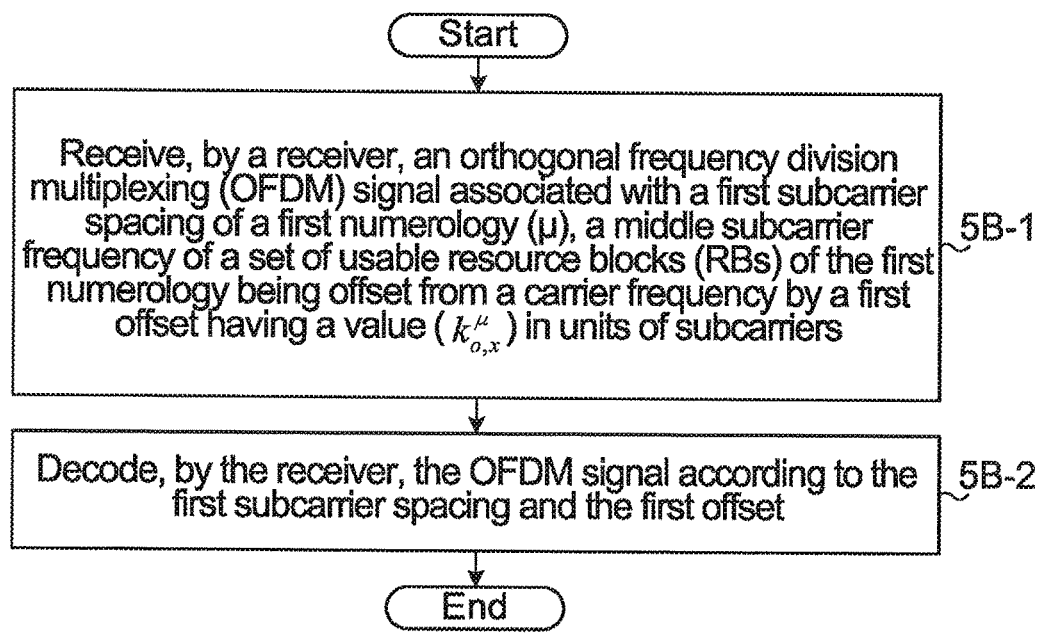

FIG. 5B is a flowchart of a method provided by an embodiment of the invention. The method of FIG. 5B is from a receiver perspective. The method begins in block 5B-1 with receiving, by a receiver, an orthogonal frequency division multiplexing (OFDM) signal associated with a first subcarrier spacing of a first numerology ($\mu$), a middle subcarrier frequency of a set of usable resource blocks (RBs) of the first numerology being offset from a carrier frequency by a first offset having a value ($k_{0,x}^{\mu}$) in units of subcarriers. The value of the first offset is defined by:

$$k_{0,x}^{\mu} = (N_{grid,x}^{start,\mu} + N_{grid,x}^{size,\mu}/2)N_{sc}^{RB} - (N_{grid,x}^{start,\mu_0} + N_{grid,x}^{size,\mu_0}/2)N_{sc}^{RB}2^{\mu_0-\mu}$$

x is a channel direction, either "DL" for downlink or "UL" for uplink, $\mu_0$ is a reference numerology associated with a reference subcarrier spacing, $N_{grid,x}^{start,\mu}$ art, is a value of a second offset from a defined reference point to a start of the set of usable RBs for the first numerology $\mu$, in units of RBs, in the channel direction x $N_{grid,x}^{size,\mu}$ is a number of RBs in the set of usable RBs for the first numerology $\mu$, in the channel direction x $N_{grid,x}^{start,\mu_0}$ is a value of a third offset from the defined reference point to a start of a set of usable RBs for the reference numerology $\mu_0$, in units of RBs, in the channel direction x $N_{grid,x}^{size,\mu_0}$ is a number of RBs in the set of usable RBs for the reference numerology $\mu_0$, in the channel direction x; and The method continues in block 5B-2 with decoding, by the receiver, the OFDM signal according to the first subcarrier spacing and the first offset.

Figure 6A:
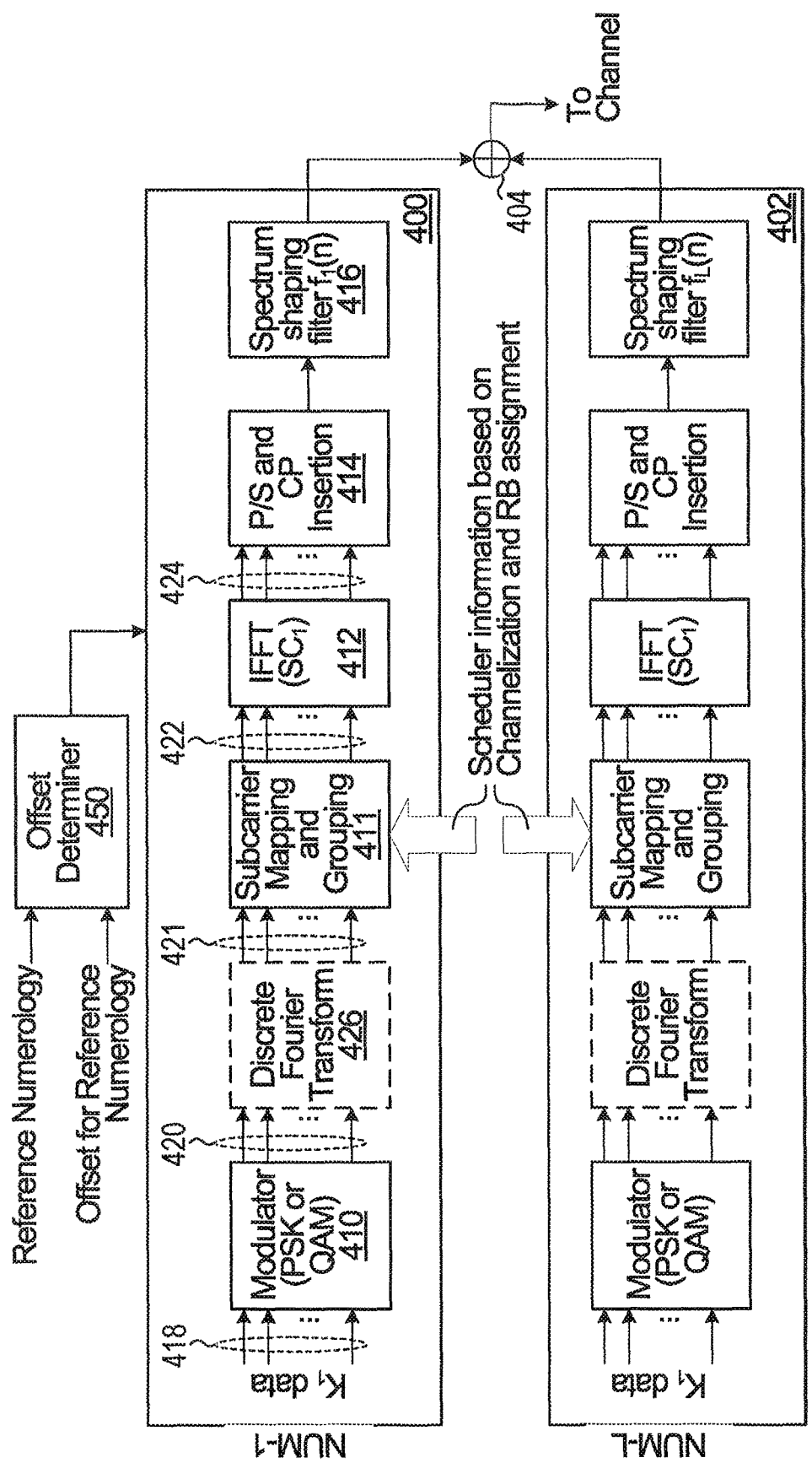
FIGS. 6A and 6B are detailed block diagrams of a transmitter and a receiver respectively.

Referring now to FIG. 6A, shown is an example simplified block diagram of part of a transmitter that can be used to perform OFDM signal generation and transmission as described above. In this example, there are L supported numerologies, where L≥2.

Figure 8A:
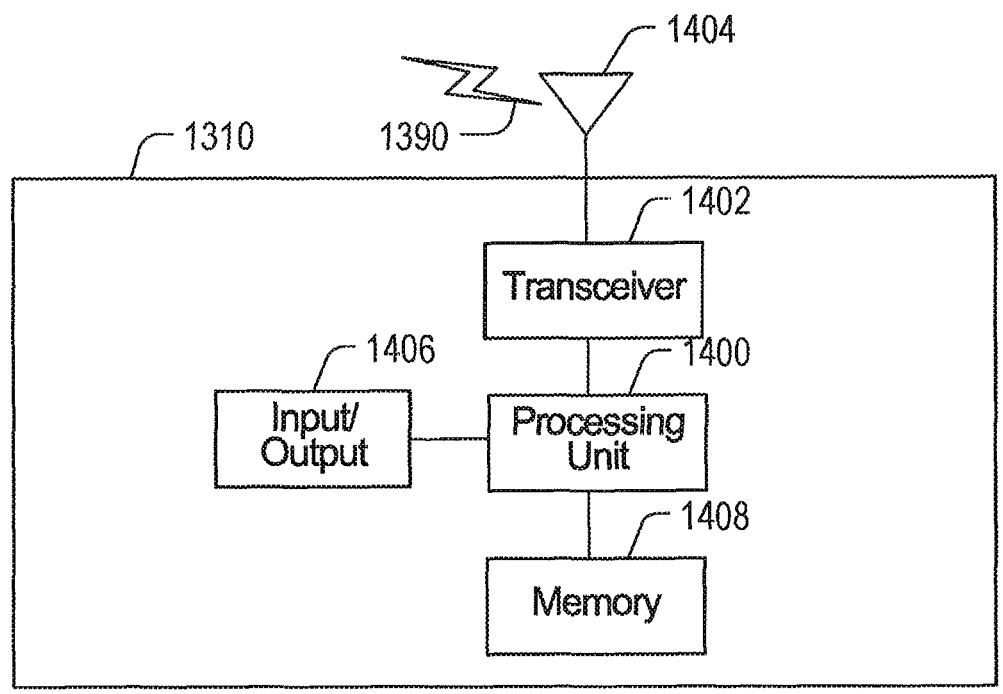
FIG. 8A is a block diagram of an example electronic device.
Figure 8B:
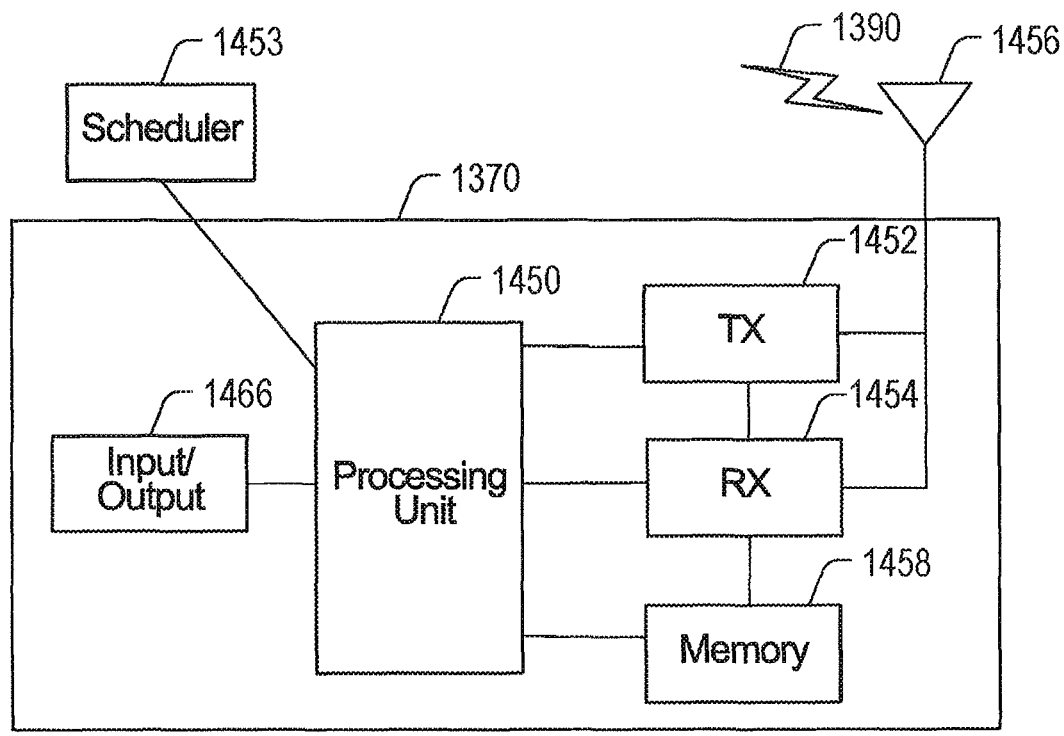
FIG. 8B is a block diagram of an example electronic device.

For each numerology, there is a respective transmit chain 400, 402. FIG. 8A shows simplified functionality for the first and Lth numerology; the functionality for other numerologies would be similar. Also shown in FIG. 8B is simplified functionality for a receive chain 403 for a receiver operating using the first numerology. However, some receivers may be capable of receiving using multiple numerologies.

The transmit chain 400 for the first numerology includes a modulator 410, subcarrier mapping and grouping block 411, IFFT 412 with subcarrier spacing $SC_1$, parallel to serial and cyclic prefix insertion 414, and spectrum shaping filter 416. In operation, modulator 410 receives data (more generally, content containing data and/or signalling) for $K_1$ EDs (electronic devices), Where $K_1 >= 1$. The modulator 410 maps the ED data for each of the $K_1$ EDs to a respective stream of constellation symbols (e.g., PSK, QAM, OQAM) and outputs this at 420. The number of bits per symbol depends on the particular constellation employed by the modulator 410. In the example of $2^N$-quadrature amplitude modulation (QAM), N bits from for each ED are mapped to a respective QAM symbol.

Optionally, for example in SC-FDMA embodiments used for uplink communication, the output 420 is received by a discrete Fourier transform (DFT) 426. The output of the DFT is shown at 421. Other embodiments, such as OFDM embodiments, do not include the DFT 426, in which case the output 420 is passed directly to 421.

For each OFDM symbol period, the subcarrier mapping and grouping block 411 groups and maps the input 421 to the inputs of the IFFT 412 at 422. The grouping and mapping is performed based on scheduler information, which in turn is based can channelization and resource block assignment, in accordance with a defined resource block definition and allocation for the content of the $K_1$ EDs being processed in transmit chain 400. P is the size of the IFFT 412. Not all of the inputs are necessarily used for each OFDM symbol period. The IFFT 412 receives a number of symbols less than P, and outputs P time domain samples at 424. Following this, in some implementations, parallel to serial conversion is performed and a cyclic prefix is added in block 414. The spectrum shaping filter 416 applies a filter $f_1(n)$ which limits the spectrum at the output of the transmit chain 400 to prevent interference with the outputs of other transmit chains such as transmit chain 402. In some embodiments, the spectrum shaping filter 416 also performs shifting of each sub-band to its assigned frequency location. In other embodiments, a separate module (not shown) performs the shifting of each sub-band to its assigned frequency location.

The functionality of the other transmit chains, such as transmit chain 402 is similar. The outputs of all of the transmit chains are combined in a combiner 404 before transmission on the channel. In an alternative embodiment, the outputs of only a subset of the transmit chains are combined together for transmission on a single channel, and the outputs of the remaining transmit chains are transmitted on one or more other channels. This may be the case, for example, if RAN slicing is being used.

Also shown is an offset determiner 450. The offset determiner 450 is configured to determine offsets for all of the numerologies based on a reference numerology, and the offset for the reference numerology. The offset determiner 450 implements one or a combination of the methods described herein. The offset determiner 450 determines offsets for OFDM signals transmitted by the transmit chains 400,402 (and other transmit chains when present). The offset determiner 450 is a separate block that produces the offset for use by the subcarrier mapping and grouping block 411. Alternatively, the offset determiner can be implemented as part of the subcarrier mapping and grouping block 411.

Although the apparatus of FIG. 8A is shown and described in reference to a base station, a similar could be implemented in an ED. An ED could have multiple transmit chains corresponding to multiple numerologies, or a single transmit chain. The transmissions of multiple EDs are combined over the air, and received together at the base station.

Figure 6B:
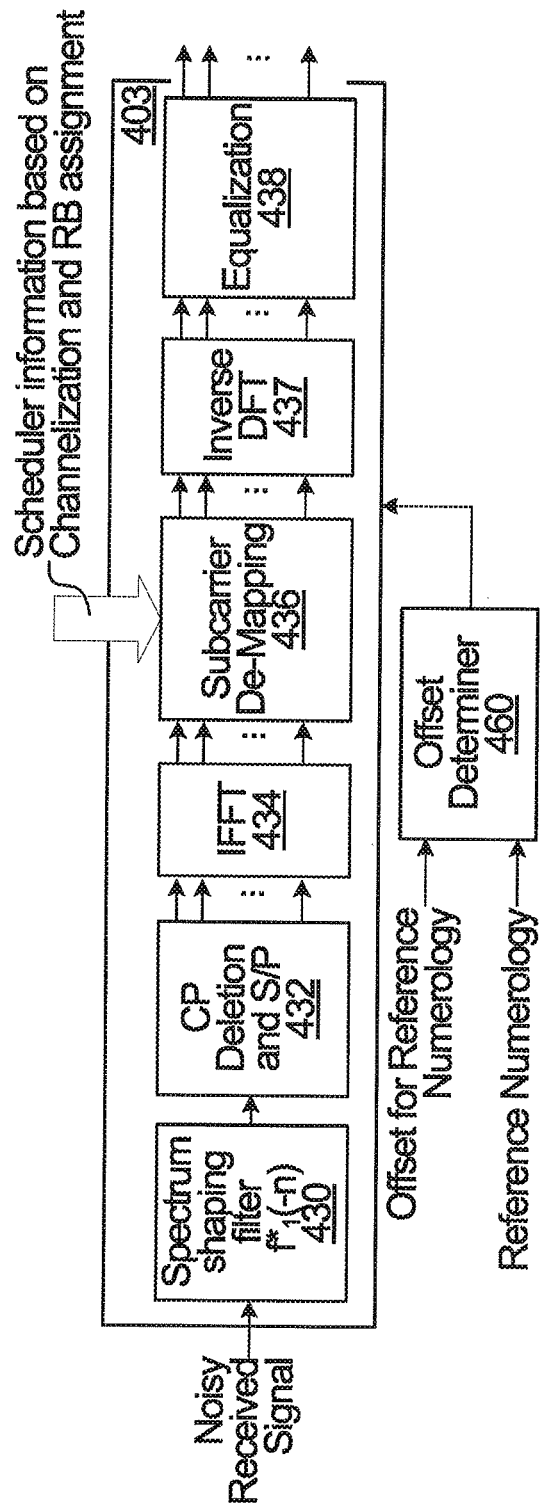

FIG. 6B shows a simplified block diagram of a receive chain for a user equipment or other electronic device operating with the first numerology depicted at 403. In some embodiments, a given user equipment is permanently configured to operate with a particular numerology. In some embodiments, a given electronic device operates with a software-configurable numerology. In either case, flexible resource block definitions are supported by the electronic device. The receive chain 403 includes spectrum shaping filter 430, cyclic prefix deletion and serial to parallel processing 432, fast Fourier transform (FFT) 434, subcarrier de-mapping 436, optional inverse DFT (IDFT) 437 for use with embodiment transmit chains including a DFT 426, and equalizer 438. It is contemplated that the spectrum shaping filter 430 may be replaced by a windowing module, a spectrally contained waveform selection module, or any other suitable module for producing a spectrally contained waveform. Each element in the receive chain performs corresponding reverse operations to those performed in the transmit chain. The receive chain for an electronic device operating with another numerology would be similar.

Also shown is an offset determiner 460. The offset determiner 460 is configured to determine offsets for all of the numerologies based on a reference numerology, and the offset for the reference numerology. The offset determiner 460 implements one or a combination of the methods described herein. The offset determiner 460 determines offset for OFDM signals received by the receive chain 403 (and other receive chains when present). The offset determiner 460 is a separate block that produces the offset for use by the subcarrier de-mapping block 436. Alternatively, the offset determiner can be implemented as part of the subcarrier de-mapping block 436.

A base station or a ED may include transmit and receive functionality, in which case the offset determiners 450,460 determine offsets in respect of both transmitted and received signals.

Figure 7:
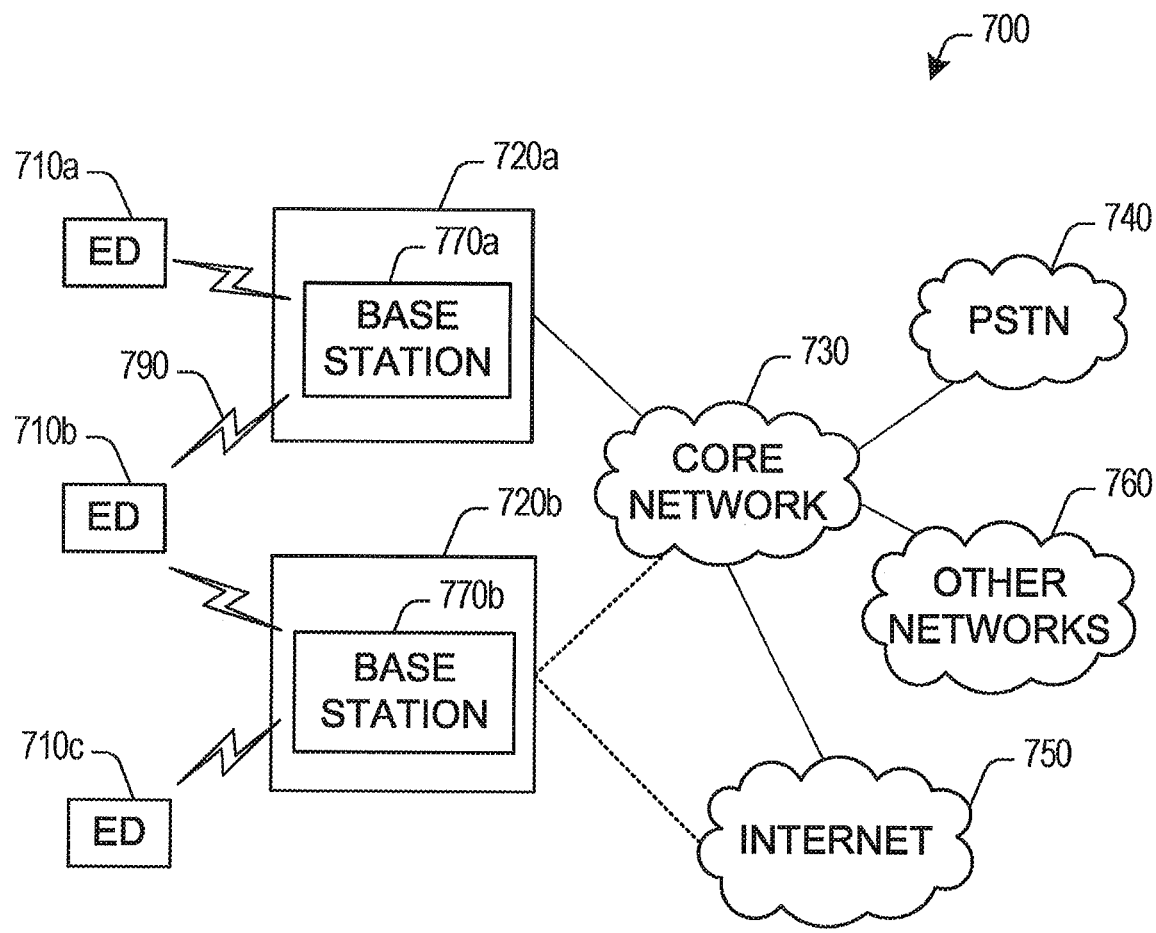
FIG. 7 is a network diagram of a communication system.

FIG. 7 illustrates an example communication system 700 in which embodiments of the present disclosure could be implemented. In general, the communication system 700 enables multiple wireless or wired elements to communicate data and other content. The purpose of the communication system 700 may be to provide content (voice, data, video, text) via broadcast, narrowcast, user device to user device, etc. The communication system 700 may operate by sharing resources such as bandwidth.

In this example, the communication system 700 includes electronic devices (ED) 710a-710c, radio access networks (RANs) 720a-720b, a core network 730, a public switched telephone network (PSTN) 740, the internet 750, and other networks 760. Although certain numbers of these components or dements are shown in FIG. 7, any reasonable number of these components or elements may be included in the communication system 700.

The EDs 710a-710c are configured to operate, communicate, or both, in the communication system 700. For example, the EDs 710a-710c are configured to transmit, receive, or both via wireless or wired communication channels. Each ED 710a-710c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 7, the RANs 720a-720b include base stations 770a-770b, respectively. Each base station 770a-770b is configured to wirelessly interface with one or more of the EDs 710a-710c to enable access to any other base station 770a-770b, the core network 730, the PSTN 740, the internet 750, and/or the other networks 760. For example, the base stations 770a-770b may include (or be) one or more of several well-known devices, such as a base transceiver station (BTS), a Node-B (NodeB), an evolved NodeB (eNodeB), a Home eNodeB, a gNodeB, a transmission point (TP), a site controller, an access point (AP), or a wireless router. Any ED 710a-710c may be alternatively or additionally configured to interface, access, or communicate with any other base station 770a-770b, the internet 750, the core network 730, the PSTN 740, the other networks 760, or any combination of the preceding. The communication system 700 may include RANs, such as RAN 720b, wherein the corresponding base station 770b accesses the core network 730 via the internet 750, as shown.

The EDs 710a-710c and base stations 770a-770b are examples of communication equipment that can be configured to implement some or all of the functionality and/or embodiments described herein. In the embodiment shown in FIG. 7, the base station 770a forms part of the RAN 720a, Which may include other base stations, base station controller(s) (BSC), radio network controller(s) (RNC), relay nodes, elements, and/or devices. Any base station 770a, 770b may be a single element, as shown, or multiple elements, distributed in the corresponding RAN, or otherwise. Also, the base station 770b forms part of the RAN 720b, which may include other base stations, elements, and/or devices. Each base station 770a-770b transmits and/or receives wireless signals within a particular geographic region or area, sometimes referred to as a "cell" or "coverage area". A cell may be further divided into cell sectors, and a base station 770a-770b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 720a-720b shown is exemplary only. Any number of RAN may be contemplated when devising the communication system 700.

The base stations 770a-770b communicate with one or more of the EDs 710a-710c over one or more air interfaces 790 using wireless communication links e.g. radio frequency (RF), microwave, infrared (IR), etc. The air interfaces 790 may utilize any suitable radio access technology. For example, the communication system 700 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 790.

The RANs 720a-720b are in communication with the core network 730 to provide the EDs 710a-710c with various services such as voice, data, and other services. The RANs 720a-720b and/or the core network 730 may be in direct or indirect communication with one or more other RANs (not shown), which may or may not be directly served by core network 730, and may or may not employ the same radio access technology as RAN 720a, RAN 720b or both. The core network 730 may also serve as a gateway access between (i) the RANs 720a-720b or EDs 710a-710c or both, and (ii) other networks (such as the PSTN 740, the internet 750, and the other networks 760). In addition, some or all of the EDs 710a-710c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 750. PSTN 740 may include circuit switched telephone networks for providing plain old telephone service (POTS). Internet 750 may include a network of computers and subnets (intranets) or both, and incorporate protocols, such as IP, TCP, UDP. EDs 710a-710c may be multimode devices capable of operation according to multiple radio access technologies, and incorporate multiple transceivers necessary to support such.

FIGS. 8A and 8B illustrate example devices that may implement the methods and teachings according to this disclosure. In particular, FIG. 8A illustrates an example ED 1310, and FIG. 8B illustrates an example base station 1370. These components could be used in the communication system 700 of FIG. 7 or in any other suitable system.

As shown in FIG. 8A, the ED 1310 includes at least one processing unit 1400. The processing unit 1400 implements various processing operations of the ED 1310. For example, the processing unit 1400 could perform signal coding, data processing, power control, input/output processing, or any other functionality enabling the ED 1310 to operate in the communication system 700. The processing unit 1400 may also be configured to implement some or all of the functionality and/or embodiments described in more detail above. Each processing unit 1400 includes any suitable processing or computing device configured to perform one or more operations. Each processing unit 1400 could, for example, include a microprocessor, microcontroller, digital signal processor, field programmable gate array, or application specific integrated circuit.

The ED 1310 also includes at least one transceiver 1402. The transceiver 1402 is configured to modulate data or other content for transmission by at least one antenna or Network interface Controller (NIC) 1404. The transceiver 1402 is also configured to demodulate data or other content received by the at least one antenna 1404. Each transceiver 1402 includes any suitable structure for generating signals for wireless or wired transmission and/or processing signals received wirelessly or by wire. Each antenna 1404 includes any suitable structure for transmitting and/or receiving wireless or wired signals. One or multiple transceivers 1402 could be used in the ED 1310. One or multiple antennas 1404 could be used in the ED 1310. Although shown as a single functional unit, a transceiver 1402 could also be implemented using at least one transmitter and at least one separate receiver.

The ED 1310 further includes one or more input/output devices 1406 or interfaces (such as a wired interface to the Internet 150). The input/output devices 1406 permit interaction with a user or other devices in the network. Each input/output device 1406 includes any suitable structure for providing information to or receiving information from a user, such as a speaker, microphone, keypad, keyboard, display, or touch screen, including network interface communications.

In addition, the ED 1310 includes at least one memory 1408. The memory 1408 stores instructions and data used, generated, or collected by the ED 110. For example, the memory 1408 could store software instructions or modules configured to implement some or all of the functionality and/or embodiments described above and that are executed by the processing unit(s) 1400. Each memory 1408 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 8B, the base station 1370 includes at least one processing unit 1450, at least one transmitter 1452, at least one receiver 1454, one or more antennas 1456, at least one memory 1458, and one or more input/output devices or interfaces 1466. A transceiver, not shown, may be used instead of the transmitter 1452 and receiver 1454. A scheduler 1453 may be coupled to the processing unit 1450. The scheduler 1453 may be included within or operated separately from the base station 1370. The processing unit 1450 implements various processing operations of the base station 1370, such as signal coding, data processing, power control, input/output processing, or any other functionality. The processing unit 1450 can also be configured to implement some or all of the functionality and/or embodiments described in more detail above. Each processing unit 1450 includes any suitable processing or computing device configured to perform one or more operations. Each processing unit 1450 could, for example, include a microprocessor, microcontroller, digital signal processor, field programmable gate array, or application specific integrated circuit.

Each transmitter 1452 includes any suitable structure for generating signals for wireless or wired transmission to one or more EDs or other devices. Each receiver 1454 includes any suitable structure for processing signals received wirelessly or by wire from one or more EDs or other devices. Although shown as separate components, at least one transmitter 1452 and at least one receiver 1454 could be combined into a transceiver. Each antenna 1456 includes any suitable structure for transmitting and/or receiving wireless or wired signals. Although a common antenna 1456 is shown here as being coupled to both the transmitter 1452 and the receiver 1454, one or more antennas 1456 could be coupled to the transmitter(s) 1452, and one or more separate antennas 1456 could be coupled to the receiver(s) 1454. Each memory 1458 includes any suitable volatile and/or non-volatile storage and retrieval device(s) such as those described above in connection to the ED 1310. The memory 1458 stores instructions and data used, generated, or collected by the base station 1370. For example, the memory 1458 could store software instructions or modules configured to implement some or all of the functionality and/or embodiments described above and that are executed by the processing unit(s) 1450.

Each input/output device 1466 permits interaction with a user or other devices in the network. Each input/output device 1466 includes any suitable structure for providing information to or receiving/providing information from a user, including network interface communications.

Numerous modifications and variations of the present disclosure are possible in light of the above teachings. It is therefore to be understood that within the scope of the appended claims, the disclosure may be practiced otherwise than as specifically described herein.

According to one aspect of the present invention, there is provided a method comprising: based on a reference numerology having an associated subcarrier spacing and an offset between a middle subcarrier frequency of a set of usable resource blocks (RBs) of the reference numerology and a carrier frequency for another numerology having another subcarrier spacing, determining another offset between a middle subcarrier frequency of a set of usable resource blocks of the another numerology and the carrier frequency; generating and transmitting an orthogonal frequency division multiplexing (OFDM) signal having the another subcarrier spacing, with the middle subcarrier frequency of the set of usable resource blocks of the another numerology offset from the carrier frequency by the another offset.

According to another aspect of the present invention, there is provided a method comprising: based on a reference numerology having an associated subcarrier spacing and an offset between a middle subcarrier frequency of a set of usable RBs of the reference numerology and a carrier frequency, for another numerology having another subcarrier spacing, determining another offset between a middle subcarrier frequency of a set of usable resource blocks of the another numerology and the carrier frequency; receiving and decoding an orthogonal frequency division multiplexing (OFDM) signal having the another subcarrier spacing, with the middle subcarrier frequency of the set of usable resource blocks of the another numerology offset from the carrier frequency by the another offset.

Optionally, determining the another offset for the another numerology is further based on an offset from a defined reference point to the start of the set of usable RBs for the another numerology.

Optionally, determining the another offset for the another numerology is further based on the number of RBs in the set of usable RBs for the another numerology.

Optionally, determining the another offset for the another numerology is further based on an offset from a defined reference point to the start of the set of usable RBs for the reference numerology.

Optionally, determining the another offset for the another numerology is further based on the number of RBs in the set of usable RBs for the reference numerology.

Optionally, the reference numerology is predefined.

Optionally, the reference numerology is the numerology with the smallest subcarrier spacing supported within a given carrier.

Optionally, the reference numerology is the same as that of another transmission or channel.

Optionally, the reference numerology is the same as that remaining system information (RMSI) as indicated by higher layer signalling.

Optionally, the reference numerology is UE implementation specific.

Optionally, transmitting or receiving signalling indicating the reference numerology.

Optionally, the offset between the middle subcarrier frequency of the set of usable resource blocks of the reference numerology and the carrier frequency is predefined.

Optionally, the offset between the middle subcarrier frequency of the set of usable resource blocks of the reference numerology and the carrier frequency is UE implementation specific.

Optionally, the offset between the middle subcarrier frequency of the set of usable resource blocks of the reference numerology and the carrier frequency is signaled through higher layer signaling.

Optionally, the reference numerology is predefined and the offset between the middle subcarrier frequency of the set of usable resource blocks of the reference numerology and the carrier frequency is predefined.

Optionally, the reference numerology is predefined as the numerology with the lowest subcarrier spacing supported within a given frequency range, and the offset between the middle subcarrier frequency of the set of usable resource blocks of the reference numerology and the carrier frequency is predefined to be 0.

Optionally the reference numerology is given by $\mu_0$; $k_{0,x}^{\mu_0}$ is the value of the offset for the reference numerology $\mu_0$ in the channel direction x, where x is either "DL" for downlink or "UL" for uplink; the another numerology is given by $\mu$; $k_{0,x}^{\mu}$ is the value of the offset for the another numerology $\mu$ in the channel direction x, where x is either "DL" for downlink or "UL" for uplink; $N_{grid,x}^{start,\mu}$ is an offset from a defined reference point A to the start of the set of usable RBs for numerology p in the channel direction x in units of RBs; $N_{grid,x}^{start,\mu}$ is the number of RBs in the set of usable RBs for the numerology p in the channel direction x; $N_{sc}^{RB}$ is the number of subcarriers in an RB; and using the reference numerology having the associated subcarrier spacing and the offset between the middle subcarrier frequency of the set of usable RBs of the reference numerology and the carrier frequency, for the another numerology having the another subcarrier spacing, determining the another offset between the middle subcarrier frequency of the set of usable resource blocks of the another numerology and the carrier frequency comprises: determining the value of $k_{0,x}^\mu$ according to: $k_{0,x}^\mu = n_{0,x}^\mu + (k_{0,x}^{\mu_0} - n_{0,x}^{\mu_0})2^{\mu_0-\mu}$, where $n_{0,x}^\mu := (N_{grid,x}^{start,\mu} + N_{grid,x}^{size,\mu}/2)N_{sc}^{RB}$ and $n_{0,x}^{\mu_0} := (N_{grid,x}^{start,\mu_0} + N_{grid,x}^{size,\mu_0}/2)N_{sc}^{RB}$.

According to another aspect of the present invention, there is provided a transmitter comprising: an offset determiner configured to, based on a reference numerology having an associated subcarrier spacing and an offset between a middle subcarrier frequency of a set of usable resource blocks (RBs) of the reference numerology and a carrier frequency, for another numerology having another subcarrier spacing, determining another offset between a middle subcarrier frequency of a set of usable resource blocks of the another numerology and the carrier frequency; a transmit chain configured to generate and transmit an orthogonal frequency division multiplexing (OFDM) signal having the another subcarrier spacing, with the middle subcarrier frequency of the set of usable resource blocks of the other numerology offset from the carrier frequency by the another offset.

According to another aspect of the present invention, there is provided an offset determiner configured to, based on a reference numerology having an associated subcarrier spacing and an offset between a middle subcarrier frequency of a set of usable RBs of the reference numerology and a carrier frequency, for another numerology having another subcarrier spacing, determine another offset between a middle subcarrier frequency of a set of usable resource blocks of the another numerology and the carrier frequency; a receive chain configured to receive and decode an orthogonal frequency division multiplexing (OFDM) signal having the another subcarrier spacing, with the middle subcarrier frequency of the set of usable resource blocks of the other numerology offset from the carrier frequency by the another offset.

According to another aspect of the present invention, there is provided the transmitters of as summarized above or described herein, configured to implement the methods summarized above or described herein According to another aspect of the present invention, there is provided the receivers summarized above or described herein configured to implement the methods summarized above or described herein.

According to another aspect of the present invention, there is provided a method comprising: obtaining, by an offset determiner, a value of a reference numerology having an associated subcarrier spacing and an offset between a middle subcarrier frequency of a set of usable resource blocks (RBs) of the reference numerology and a carrier frequency; generating, by the offset determiner, based on the obtained value of the reference numerology and offset, another offset between a middle subcarrier frequency of a set of usable resource blocks of another numerology and the carrier frequency, the another numerology having another subcarrier spacing; transmitting, by the offset determiner, the another offset to a subcarrier mapping and grouping block for mapping and grouping input data to subcarriers having the another subcarrier spacing.

According to another aspect of the present invention, there is provided a method comprising: obtaining, by a subcarrier mapping and grouping block, a value of a reference numerology having an associated subcarrier spacing and an offset between a middle subcarrier frequency of a set of usable resource blocks (RBs) of the reference numerology and a carrier frequency; generating, by the subcarrier mapping and grouping block, based on the obtained value of the reference numerology and offset, another offset between a middle subcarrier frequency of a set of usable resource blocks of another numerology and the carrier frequency, the another numerology having another subcarrier spacing, the another offset for mapping and grouping input data to subcarriers; and outputting, by the subcarrier mapping and grouping block, the mapped and grouped input data for generating an orthogonal frequency division multiplexing (OFDM) signal having the another subcarrier spacing and based on the another offset.

According to another aspect of the present invention, there is provided a method comprising: obtaining, by an offset determiner, a value of a reference numerology having an associated subcarrier spacing and an offset between a middle subcarrier frequency of a set of usable resource blocks (RBs) of the reference numerology and a carrier frequency; generating, by the offset determiner, based on the obtained value of the reference numerology and offset, another offset between a middle subcarrier frequency of a set of usable resource blocks of another numerology and the carrier frequency, the another numerology having another subcarrier spacing; transmitting, by the offset determiner, the another offset to a subcarrier de-mapping block for de-mapping subcarriers of a received orthogonal frequency division multiplexing (OFDM) signal having the another subcarrier spacing.

According to another aspect of the present invention, there is provided a method comprising: obtaining, by a subcarrier de-mapping block, a value of a reference numerology having an associated subcarrier spacing and an offset between a middle subcarrier frequency of a set of usable resource blocks (RBs) of the reference numerology and a carrier frequency; generating, by the subcarrier de-mapping block, based an the obtained value of the reference numerology and offset, another offset between a middle subcarrier frequency of a set of usable resource blocks of another numerology and the carrier frequency, the another numerology having another subcarrier spacing, the another offset for mapping and grouping input data to subcarriers; and outputting, by the subcarrier de-mapping block, the de-mapped subcarriers of a received orthogonal frequency division multiplexing (OFDM) signal having the another subcarrier spacing, and based on the another offset.

According to another aspect of the present invention, there is provided a base station comprising: an offset determiner and a subcarrier mapping and grouping block; wherein the offset determiner is configured to: obtain a value of a reference numerology having an associated subcarrier spacing and an offset between a middle subcarrier frequency of a set of usable resource blocks (RBs) of the reference numerology and a carrier frequency; based on the Obtained value of the reference numerology and offset, generate another offset between a middle subcarrier frequency of a set of usable resource blocks of another numerology and the carrier frequency, the another numerology having another subcarrier spacing; transmit the another offset to the subcarrier mapping and grouping block; wherein the subcarrier mapping and grouping block is configured to perform mapping and grouping of input data to subcarriers having the another subcarrier spacing and based on the another offset.

According to another aspect of the present invention, there is provided a base station comprising: a subcarrier mapping and grouping block configured to: obtaining a value of a reference numerology having an associated subcarrier spacing and an offset between a middle subcarrier frequency of a set of usable resource blocks (RBs) of the reference numerology and a carrier frequency; based on the obtained value of the reference numerology and offset, generate another offset between a middle subcarrier frequency of a set of usable resource blocks of another numerology and the carrier frequency, the another numerology having another subcarrier spacing, the another offset for mapping and grouping input data to subcarriers; and output mapped and grouped input data for generating an orthogonal frequency division multiplexing (OFDM) signal having the another subcarrier spacing and based on the another offset.

According to another aspect of the present invention, there is provided a user equipment comprising: an offset determiner and a subcarrier de-mapping block; wherein the offset determiner is configured to: obtain obtaining a value of a reference numerology having an associated subcarrier spacing and an offset between a middle subcarrier frequency of a set of usable resource blocks (RBs) of the reference numerology and a carrier frequency; based on the Obtained value of the reference numerology and offset, generate another offset between a middle subcarrier frequency of a set of usable resource blocks of another numerology and the carrier frequency, the another numerology having another subcarrier spacing; and transmit the another offset to the subcarrier de-mapping block; wherein the subcarrier de-mapping block is configured to perform de-mapping of subcarriers of a received orthogonal frequency division multiplexing (OFDM) signal having the another subcarrier spacing and based on the another offset.

According to another aspect of the present invention, there is provided a user equipment comprising: a subcarrier de-mapping block configured to: obtain a value of a reference numerology having an associated subcarrier spacing and an offset between a middle subcarrier frequency of a set of usable resource blocks (RBs) of the reference numerology and a carrier frequency; based on the obtained value of the reference numerology and offset, generate another offset between a middle subcarrier frequency of a set of usable resource blocks of another numerology and the carrier frequency, the another numerology having another subcarrier spacing, the another offset for mapping and grouping input data to subcarriers; and output de-mapped subcarriers of a received orthogonal frequency division multiplexing (OFDM) signal having the another subcarrier spacing and based on the another offset.

The invention claimed is:

1. A method comprising:
receiving, by an apparatus, orthogonal frequency division multiplexing (OFDM) signal parameters including a first subcarrier spacing of a first numerology μ, a value of a first offset $N_{grid,x}^{start,\mu}$ in units of resource blocks (RBs), a quantity $N_{grid,x}^{start,\mu}$ of usable RBs of the first numerology μ, a value of a second offset $N_{grid,x}^{start,\mu_0}$ in units of RBs, and a quantity $N_{grid,x}^{start,\mu_0}$ of usable RBs of a reference numerology $\mu_0$, wherein:
x identifies a transmission direction being either downlink (DL) or uplink (UL),
the first offset is between a reference point and a start of the usable RBs of the first numerology μ, and
the second offset is between the reference point and a start of the usable RBs of the reference numerology $\mu_0$; and
transmitting or receiving, by the apparatus, an OFDM signal associated with a third offset, wherein a value $k_{0,x}^\mu$ of the third offset satisfies:

$$k_{0,x}^\mu = (N_{grid,x}^{start,\mu} + N_{grid,x}^{size,\mu}/2)N_{sc}^{RB} - (N_{grid,x}^{start,\mu_0} + N_{grid,x}^{size,\mu_0}/2)N_{sc}^{RB}2^{\mu_0 - \mu}$$

and wherein $N_{sc}^{RB}$ indicates a quantity of subcarriers in a RB.

2. The method of claim 1, wherein the OFDM signal is a physical random-access channel (PRACH) signal, and the transmitting the OFDM signal comprises:
generating a time-continuous signal $s_l^{(p,\mu)}(t)$ on antenna port p and the first subcarrier spacing of the first numerology μ, for OFDM symbol 1 in a subframe, according to:

$$s_l^{(p,\mu)}(t) = \sum_{k=0}^{L_{RA}-1} a_{k,l}^{(p,RA)} \cdot e^{j2\pi(k+Kk_1+\bar{k})\Delta f_{RA}(t - N_{CP,l}^{RA}T_c - t_{start}^{RA})}$$

$$K = \Delta f / \Delta f_{RA}$$

$$k_1 = k_0^\mu + N_{BWP,i}^{start}N_{sc}^{RB} + n_{RA}^{start}N_{sc}^{RB} + n_{RA}N_{RB}^{RA}N_{sc}^{RB} - N_{grid}^{size,\mu}N_{sc}^{RB}/2.$$

3. The method of claim 1, wherein the first subcarrier spacing is one of 15 kHz, 30 kHz, 60 kHz, 120 kHz, or 240 kHz.

4. The method of claim 1, wherein the third offset is between a middle subcarrier frequency of the usable RBs of the first numerology and a middle subcarrier frequency of the usable RBs of the reference numerology $\mu_0$.

5. The method of claim 1, wherein the reference point coincides with a center of a lowest numbered subcarrier in a lowest numbered common resource block (CRB) of the first numerology μ, and the reference point coincides with a center of a lowest numbered subcarrier in a lowest numbered CRB of the reference numerology $\mu_0$.

6. The method of claim 1, wherein the transmitting the OFDM signal comprises:
generating a time-continuous signal $s_l^{(p,\mu)}(t)$ on antenna port p and the first subcarrier spacing of the first numerology μ, for OFDM symbol 1 in a subframe, according to:

$$s_l^{(p,\mu)}(t) = \sum_{k=0}^{N_{grid}^{size,\mu}N_{90}^{RB}-1} a_{k,l}^{(p,\mu)} \cdot e^{j2\pi(k+k_0^\mu - N_{grid}^{size,\mu}N_{sc}^{RB}/2)\Delta f(t - N_{CP,l}^\mu T_c - t_{start,l}^\mu)}.$$

7. The method of claim 1, wherein the apparatus receives the OFDM signal, and wherein the OFDM signal received by the apparatus is a physical random-access channel (PRACH) signal defined by a time-continuous signal $s_l^{(p,\mu)}(t)$ on antenna port p and the first subcarrier spacing of the first numerology μ, for OFDM symbol 1 in a subframe, the time-continuous signal $s_l^{(p,\mu)}(t)$ further defined by:

$$s_l^{(p,\mu)}(t) = \sum_{k=0}^{L_{RA}-1} a_{k,l}^{(p,RA)} \cdot e^{j2\pi(k+Kk_1+\bar{k})\Delta f_{RA}(t - N_{CP,l}^{RA}T_c - t_{start}^{RA})}$$

$$K = \Delta f / \Delta f_{RA}$$

$$k_1 = k_0^\mu + N_{BWP,i}^{start}N_{sc}^{RB} + n_{RA}^{start}N_{sc}^{RB} + n_{RA}N_{RB}^{RA}N_{sc}^{RB} - N_{grid}^{size,\mu}N_{sc}^{RB}/2.$$

8. The method of claim 1, wherein the apparatus receives the OFDM signal, and wherein the OFDM signal received by the apparatus is a time-continuous signal $s_l^{(p,\mu)}(t)$ on antenna port p and the first subcarrier spacing of the first numerology μ, for OFDM symbol 1 in a subframe, the time-continuous signal $s_l^{(p,\mu)}(t)$ defined by:

$$s_l^{(p,\mu)}(t) = \sum_{k=0}^{N_{grid}^{size,\mu} N_{90}^{RB}-1} a_{k,l}^{(p,\mu)} \cdot e^{j2\pi\left(k+k_0^\mu - N_{grid}^{size,\mu} N_{sc}^{RB}/2\right)} \Delta f\left(t - N_{CP,l}^\mu T_c - t_{start,l}^\mu\right).$$

9. An apparatus comprising:
a non-transitory memory storage comprising instructions; and
one or more processors in communication with the non-transitory memory storage, wherein the one or more processors execute the instructions to cause the apparatus to perform operations including:
receiving orthogonal frequency division multiplexing (OFDM) signal parameters including a first subcarrier spacing of a first numerology μ, a value of a first offset $N_{grid,x}^{start,\mu}$ in units of resource blocks (RBs), a quantity $N_{grid,x}^{start,\mu}$ of usable RBs of the first numerology μ, a value of a second offset $N_{grid,x}^{start,\mu_0}$ in units of RBs, and a quantity $N_{grid,x}^{start,\mu_0}$ of usable RBs of a reference numerology $\mu_0$, wherein:
x identifies a transmission direction being either downlink (DL) or uplink (UL),
the first offset is between a reference point and a start of the usable RBs of the first numerology μ, and
the second offset is between the reference point and a start of the usable RBs of the reference numerology $\mu_0$; and
transmitting or receiving an OFDM signal associated with a third offset, wherein a value $k_{0,x}^\mu$ of the third offset satisfies:

$k_{0,x}^\mu = (N_{grid,x}^{start,\mu} + N_{grid,x}^{size,\mu}/2)N_{sc}^{RB} - (N_{grid,x}^{start,\mu_0} + N_{grid,x}^{size,\mu_0}/2)N_{sc}^{RB} 2^{\mu_0-\mu}$ and wherein $N_{sc}^{RB}$ indicates a quantity of subcarriers in a RB.

10. The apparatus of claim 9, wherein the OFDM signal is a physical random-access channel (PRACH) signal, and the transmitting the OFDM signal comprises:
generating a time-continuous signal $s_l^{(p,\mu)}(t)$ on antenna port p and the first subcarrier spacing of the first numerology μ, for OFDM symbol l in a subframe, according to:

$$s_l^{(p,\mu)}(t) = \sum_{k=0}^{L_{RA}-1} a_{k,l}^{(p,RA)} \cdot e^{j2\pi(k+Kk_1+\bar{k})} \Delta f_{RA}\left(t - N_{CP,l}^{RA} T_c - t_{start}^{RA}\right)$$

$K = \Delta f / \Delta f_{RA}$ $k_1 = k_0^\mu + N_{BWP,i}^{start} N_{sc}^{RB} + n_{RA}^{start} N_{sc}^{RB} + n_{RA} N_{RB}^{RA} N_{sc}^{RB} - N_{grid}^{size,\mu} N_{sc}^{RB}/2.$ 11. The apparatus of claim 9, wherein the first subcarrier spacing is one of 15 kHz, 30 kHz, 60 kHz, 120 kHz, or 240 kHz.

12. The apparatus of claim 9, wherein the third offset is between a middle subcarrier frequency of the usable RBs of the first numerology and a middle subcarrier frequency of the usable RBs of the reference numerology $\mu_0$.

13. The apparatus of claim 9, wherein the reference point coincides with a center of a lowest numbered subcarrier in a lowest numbered common resource block (CRB) of the first numerology μ, and the reference point coincides with a center of a lowest numbered subcarrier in a lowest numbered CRB of the reference numerology $\mu_0$.

14. The apparatus of claim 9, wherein the transmitting the OFDM signal comprises:
generating a time-continuous signal $s_l^{(p,\mu)}(t)$ on antenna port p and the first subcarrier spacing of the first numerology μ, for OFDM symbol l in a subframe, according to:

$$s_l^{(p,\mu)}(t) = \sum_{k=0}^{N_{grid}^{size,\mu} N_{90}^{RB}-1} a_{k,l}^{(p,\mu)} \cdot e^{j2\pi\left(k+k_0^\mu - N_{grid}^{size,\mu} N_{sc}^{RB}/2\right)} \Delta f\left(t - N_{CP,l}^\mu T_c - t_{start,l}^\mu\right).$$

15. The apparatus of claim 9, wherein the received OFDM signal is a physical random-access channel (PRACH) signal defined by a time-continuous signal $s_l^{(p,\mu)}(t)$ on antenna port p and the first subcarrier spacing of the first numerology μ, for OFDM symbol l in a subframe, the time-continuous signal $s_l^{(p,\mu)}(t)$ further defined by:

$$s_l^{(p,\mu)}(t) = \sum_{k=0}^{L_{RA}-1} a_{k,l}^{(p,RA)} \cdot e^{j2\pi(k+Kk_1+\bar{k})} \Delta f_{RA}\left(t - N_{CP,l}^{RA} T_c - t_{start}^{RA}\right)$$

$K = \Delta f / \Delta f_{RA}$ $k_1 = k_0^\mu + N_{BWP,i}^{start} N_{sc}^{RB} + n_{RA}^{start} N_{sc}^{RB} + n_{RA} N_{RB}^{RA} N_{sc}^{RB} - N_{grid}^{size,\mu} N_{sc}^{RB}/2.$ 16. The apparatus of claim 9, wherein the received OFDM signal is a time-continuous signal $s_l^{(p,\mu)}(t)$ on antenna port p and the first subcarrier spacing of the first numerology μ, for OFDM symbol l in a subframe, the time-continuous signal $s_l^{(p,\mu)}(t)$ defined by:

$$s_l^{(p,\mu)}(t) = \sum_{k=0}^{N_{grid}^{size,\mu} N_{90}^{RB}-1} a_{k,l}^{(p,\mu)} \cdot e^{j2\pi\left(k+k_0^\mu - N_{grid}^{size,\mu} N_{sc}^{RB}/2\right)} \Delta f\left(t - N_{CP,l}^\mu T_c - t_{start,l}^\mu\right).$$

17. A method comprising:
transmitting, by an apparatus, orthogonal frequency division multiplexing (OFDM) signal parameters including a first subcarrier spacing of a first numerology μ, a value of a first offset $N_{grid,x}^{start,\mu}$ in units of resource blocks (RBs), a quantity $N_{grid,x}^{start,\mu}$ of usable RBs of the first numerology μ, a value of a second offset $N_{grid,x}^{start,\mu_0}$ in units of RBs, and a quantity $N_{grid,x}^{start,\mu_0}$ of usable RBs of a reference numerology $\mu_0$, wherein:
x identifies a transmission direction being either downlink (DL) or uplink (UL),
the first offset is between a reference point and a start of the usable RBs of the first numerology μ, and
the second offset is between the reference point and a start of the usable RBs of the reference numerology $\mu_0$; and
transmitting or receiving, by the apparatus, an OFDM signal associated with a third offset, wherein a value $k_{0,x}^\mu$ of the third offset satisfies:

$k_{0,x}^\mu = (N_{grid,x}^{start,\mu} + N_{grid,x}^{size,\mu}/2)N_{sc}^{RB} - (N_{grid,x}^{start,\mu_0} + N_{grid,x}^{size,\mu_0}/2)N_{sc}^{RB} 2^{\mu_0-\mu}$ and wherein $N_{sc}^{RB}$ indicates a quantity of subcarriers in a RB.

18. The method of claim 17, wherein the transmitting the OFDM signal comprises:
generating a time-continuous signal $s_l^{(p,\mu)}(t)$ on antenna port p and the first subcarrier spacing of the first numerology μ, for OFDM symbol l in a subframe, according to:

$$s_l^{(p,\mu)}(t) = \sum_{k=0}^{N_{grid}^{size,\mu} N_{90}^{RB}-1} a_{k,l}^{(p,\mu)} \cdot e^{j2\pi(k+k_0^\mu - N_{grid}^{size,\mu} N_{sc}^{RB}/2)} \Delta f(t - N_{CP,l}^\mu T_c - t_{start,l}^\mu).$$

19. The method of claim 17, wherein the OFDM signal is a physical random-access channel (PRACH) signal, and the transmitting the OFDM signal comprises:

generating a time-continuous signal $s_l^{(p,\mu)}(t)$ on antenna port p and the first subcarrier spacing of the first numerology μ, for OFDM symbol l in a subframe, according to:

$$s_l^{(p,\mu)}(t) = \sum_{k=0}^{L_{RA}-1} a_{k,l}^{(p,RA)} \cdot e^{j2\pi(k+Kk_1+\bar{k})} \Delta f_{RA}(t - N_{CP,l}^{RA} T_c - t_{start}^{RA})$$

$$K = \Delta f / \Delta f_{RA}$$

$$k_1 = k_0^\mu + N_{BWP,i}^{start} N_{sc}^{RB} + n_{RA}^{start} N_{sc}^{RB} + n_{RA} N_{RB}^{RA} N_{sc}^{RB} - N_{grid}^{size,\mu} N_{sc}^{RB}/2.$$

20. The method of claim 17, wherein the apparatus receives the OFDM signal, and the OFDM signal received by the apparatus is a time-continuous signal $s_l^{(p,\mu)}(t)$ on antenna port p and the first subcarrier spacing of the first numerology μ, for OFDM symbol l in a subframe, the time-continuous signal $s_l^{(p,\mu)}(t)$ defined by:

$$s_l^{(p,\mu)}(t) = \sum_{k=0}^{N_{grid}^{size,\mu} N_{90}^{RB}-1} a_{k,l}^{(p,\mu)} \cdot e^{j2\pi(k+k_0^\mu - N_{grid}^{size,\mu} N_{sc}^{RB}/2)} \Delta f(t - N_{CP,l}^\mu T_c - t_{start,l}^\mu).$$

21. The method of claim 17, wherein the received OFDM signal is a physical random-access channel (PRACH) signal defined by a time-continuous signal $s_l^{(p,\mu)}(t)$ on antenna port p and the first subcarrier spacing of the first numerology μ, for OFDM symbol l in a subframe, the time-continuous signal $s_l^{(p,\mu)}(t)$ further defined by:

$$s_l^{(p,\mu)}(t) = \sum_{k=0}^{L_{RA}-1} a_{k,l}^{(p,RA)} \cdot e^{j2\pi(k+Kk_1+\bar{k})} \Delta f_{RA}(t - N_{CP,l}^{RA} T_c - t_{start}^{RA})$$

$$K = \Delta f / \Delta f_{RA}$$

$$k_1 = k_0^\mu + N_{BWP,i}^{start} N_{sc}^{RB} + n_{RA}^{start} N_{sc}^{RB} + n_{RA} N_{RB}^{RA} N_{sc}^{RB} - N_{grid}^{size,\mu} N_{sc}^{RB}/2.$$

22. The method of claim 17, wherein the first subcarrier spacing is one of 15 kHz, 30 kHz, 60 kHz, 120 kHz, or 240 kHz.

23. The method of claim 17, wherein the third offset is between a middle subcarrier frequency of the usable RBs of the first numerology and a middle subcarrier frequency of the usable RBs of the reference numerology $\mu_0$.

24. The method of claim 17, wherein the reference point coincides with a center of a lowest numbered subcarrier in a lowest numbered common resource block (CRB) of the first numerology μ, and the reference point coincides with a center of a lowest numbered subcarrier in a lowest numbered CRB of the reference numerology $\mu_0$.

25. An apparatus comprising:

a non-transitory memory storage comprising instructions; and one or more processors in communication with the non-transitory memory storage, wherein the one or more processors execute the instructions to cause the apparatus to perform operations including:

transmitting orthogonal frequency division multiplexing (OFDM) signal parameters including a first subcarrier spacing of a first numerology μ, a value of a first offset $N_{grid,x}^{start,\mu}$ in units of resource blocks (RBs), a quantity $N_{grid,x}^{start,\mu}$ of usable RBs of the first numerology μ, a value of a second offset $N_{grid,x}^{start,\mu_0}$ in units of RBs, and a quantity $N_{grid,x}^{start,\mu_0}$ of usable RBs of a reference numerology $\mu_0$, wherein:

x identifies a transmission direction being either downlink (DL) or uplink (UL), the first offset is between a reference point and a start of the usable RBs of the first numerology μ, and the second offset is between the reference point and a start of the usable RBs of the reference numerology $\mu_0$; and transmitting or receiving an OFDM signal associated with a third offset, wherein a value $k_{0,x}^\mu$ of the third offset satisfies:

$$k_{0,x}^\mu = (N_{grid,x}^{start,\mu} + N_{grid,x}^{size,\mu}/2) N_{sc}^{RB} - (N_{grid,x}^{start,\mu_0} + N_{grid,x}^{size,\mu_0}/2) N_{sc}^{RB} 2^{\mu_0 - \mu}$$

and wherein $N_{sc}^{RB}$ indicates a quantity of subcarriers in a RB.

26. The apparatus of claim 25, wherein the transmitting the OFDM signal comprises:

generating a time-continuous signal $s_l^{(p,\mu)}(t)$ on antenna port p and the first subcarrier spacing of the first numerology μ, for OFDM symbol l in a subframe, according to:

$$s_l^{(p,\mu)}(t) = \sum_{k=0}^{N_{grid}^{size,\mu} N_{90}^{RB}-1} a_{k,l}^{(p,\mu)} \cdot e^{j2\pi(k+k_0^\mu - N_{grid}^{size,\mu} N_{sc}^{RB}/2)} \Delta f(t - N_{CP,l}^\mu T_c - t_{start,l}^\mu).$$

27. The apparatus of claim 25, wherein the OFDM signal is a physical random-access channel (PRACH) signal, and the transmitting the OFDM signal comprises:

generating a time-continuous signal $s_l^{(p,\mu)}(t)$ on antenna port p and the first subcarrier spacing of the first numerology μ, for OFDM symbol l in a subframe according to:

$$s_l^{(p,\mu)}(t) = \sum_{k=0}^{L_{RA}-1} a_{k,l}^{(p,RA)} \cdot e^{j2\pi(k+Kk_1+\bar{k})} \Delta f_{RA}(t - N_{CP,l}^{RA} T_c - t_{start}^{RA})$$

$$K = \Delta f / \Delta f_{RA}$$

$$k_1 = k_0^\mu + N_{BWP,i}^{start} N_{sc}^{RB} + n_{RA}^{start} N_{sc}^{RB} + n_{RA} N_{RB}^{RA} N_{sc}^{RB} - N_{grid}^{size,\mu} N_{sc}^{RB}/2.$$

28. The apparatus of claim 25, wherein the received OFDM signal is a time-continuous signal $s_l^{(p,\mu)}(t)$ on antenna port p and the first subcarrier spacing of the first numerology μ, for OFDM symbol l in a subframe, the time-continuous signal $s_l^{(p,\mu)}(t)$ defined by:

$$s_l^{(p,\mu)}(t) = \sum_{k=0}^{N_{grid}^{size,\mu} N_{90}^{RB}-1} a_{k,l}^{(p,\mu)} \cdot e^{j2\pi(k+k_0^\mu - N_{grid}^{size,\mu} N_{sc}^{RB}/2)} \Delta f(t - N_{CP,l}^\mu T_c - t_{start,l}^\mu).$$

29. The apparatus of claim 25, wherein the received OFDM signal is a physical random-access channel (PRACH) signal defined by a time-continuous signal $s_l^{(p,\mu)}(t)$ on antenna port p and the first subcarrier spacing of the first numerology μ, for OFDM symbol l in a subframe, the time-continuous signal $s_l^{(p,\mu)}(t)$ further defined by:

$$s_l^{(p,\mu)}(t) = \sum_{k=0}^{L_{RA}-1} a_{k,l}^{(p,RA)} \cdot e^{j2\pi(k+Kk_1+\bar{k})\Delta f_{RA}\left(t - N_{CP,l}^{RA}T_c - t_{start}^{RA}\right)}$$

$$K = \Delta f / \Delta f_{RA}$$

$$k_1 = k_0^\mu + N_{BWP,i}^{start}N_{sc}^{RB} + n_{RA}^{start}N_{sc}^{RB} + n_{RA}N_{RB}^{RA}N_{sc}^{RB} - N_{grid}^{size,\mu}N_{sc}^{RB}/2.$$

30. The apparatus of claim 25, wherein the first subcarrier spacing is one of 15 kHz, 30 kHz, 60 kHz, 120 kHz, or 240 kHz.

* * * * *

UNITED STATES PATENT AND TRADEMARK OFFICE
CERTIFICATE OF CORRECTION

PATENT NO. : 11,936,508 B2
APPLICATION NO. : 17/377002
DATED : March 19, 2024
INVENTOR(S) : Abdoli It is certified that error appears in the above-identified patent and that said Letters Patent is hereby corrected as shown below:

In the Claims

Column 23, Claim 1, Line 50; delete "$N_{grid,x}^{start,\mu}$" and insert --$N_{grid,x}^{size,\mu}$--.

Column 23, Claim 1, Line 52; delete "$N_{grid,x}^{start,\mu_0}$" and insert --$N_{grid,x}^{size,\mu_0}$--.

Column 25, Claim 9, Line 18; delete "$N_{grid,x}^{start,\mu}$" and insert --$N_{grid,x}^{size,\mu}$--.

Column 25, Claim 9, Line 20; delete "$N_{grid,x}^{start,\mu_0}$" and insert --$N_{grid,x}^{size,\mu_0}$--.

Column 26, Claim 17, Line 44; delete "$N_{grid,x}^{start,\mu}$" and insert --$N_{grid,x}^{size,\mu}$--.

Column 26, Claim 17, Line 46; delete "quantity $N_{grid,x}^{start,\mu_0}$" and insert --quantity $N_{grid,x}^{size,\mu_0}$--.

Column 28, Claim 25, Line 7; delete "$N_{grid,x}^{start,\mu}$" and insert --$N_{grid,x}^{size,\mu}$--.

Signed and Sealed this
Thirty-first Day of December, 2024

Derrick Brent
*Acting Director of the United States Patent and Trademark Office*

CERTIFICATE OF CORRECTION (continued)
U.S. Pat. No. 11,936,508 B2

Column 28, Claim 25, Lines 9-10; delete "quantity $N_{grid,x}^{start,\mu_0}$" and insert --quantity $N_{grid,x}^{size,\mu_0}$ --.